United States Patent
Bean et al.

(10) Patent No.: US 7,975,132 B2
(45) Date of Patent: Jul. 5, 2011

(54) APPARATUS AND METHOD FOR FAST CORRECT RESOLUTION OF CALL AND RETURN INSTRUCTIONS USING MULTIPLE CALL/RETURN STACKS IN THE PRESENCE OF SPECULATIVE CONDITIONAL INSTRUCTION EXECUTION IN A PIPELINED MICROPROCESSOR

(75) Inventors: Brent Bean, Austin, TX (US); Terry Parks, Austin, TX (US); G. Glenn Henry, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 284 days.

(21) Appl. No.: 12/481,074

(22) Filed: Jun. 9, 2009

(65) Prior Publication Data
US 2010/0228952 A1 Sep. 9, 2010

Related U.S. Application Data

(60) Provisional application No. 61/157,351, filed on Mar. 4, 2009.

(51) Int. Cl.
*G06F 9/38* (2006.01)
(52) U.S. Cl. .................................. 712/234; 712/233
(58) Field of Classification Search ........... 712/233–244
See application file for complete search history.

(56) References Cited

U.S. PATENT DOCUMENTS

| | | | | |
|---|---|---|---|---|
| 5,179,673 A * | 1/1993 | Steely et al. | .................. | 712/239 |
| 5,604,877 A * | 2/1997 | Hoyt et al. | ..................... | 712/243 |
| 5,623,614 A * | 4/1997 | Van Dyke et al. | ............. | 712/240 |
| 5,850,343 A * | 12/1998 | Nakamura | ...................... | 700/174 |
| 5,964,868 A * | 10/1999 | Gochman et al. | ............. | 712/234 |
| 6,092,175 A * | 7/2000 | Levy et al. | ....................... | 712/23 |
| 6,151,671 A * | 11/2000 | D'Sa et al. | ..................... | 712/239 |
| 6,247,121 B1 * | 6/2001 | Akkary et al. | ................ | 712/239 |
| 6,289,444 B1 * | 9/2001 | Nair | .............................. | 712/243 |
| 6,314,514 B1 | 11/2001 | McDonald | | |
| 7,178,010 B2 * | 2/2007 | McDonald | ..................... | 712/225 |
| 7,200,740 B2 * | 4/2007 | Henry et al. | ................... | 712/239 |
| 7,234,045 B2 * | 6/2007 | Henry et al. | ................... | 712/237 |
| 7,254,693 B2 * | 8/2007 | Eisen et al. | ...................... | 712/23 |
| 7,320,066 B2 * | 1/2008 | Yokoi | ............................ | 712/239 |
| 7,478,226 B1 * | 1/2009 | Klaiber et al. | ................ | 712/216 |
| 7,581,089 B1 * | 8/2009 | White | ............................ | 712/242 |
| 7,865,705 B2 * | 1/2011 | Levitan et al. | ................ | 712/239 |
| 2006/0095750 A1 * | 5/2006 | Nye et al. | ....................... | 712/240 |

* cited by examiner

*Primary Examiner* — William M Treat
(74) *Attorney, Agent, or Firm* — E. Alan Davis; James W. Huffman

(57) ABSTRACT

A microprocessor having a plurality of call/return stacks (CRS) correctly resolves a call or return instruction rather than issuing the instruction to execution units of the microprocessor to be resolved. The microprocessor fetches a call or return instruction and determines whether the instruction is the first call or return instruction fetched after fetching a conditional branch instruction that has yet to be resolved. The microprocessor copies the contents of a current CRS to another CRS and designates the other CRS as the current CRS, if the state exists. The microprocessor pushes the address of the next sequential instruction following the call instruction onto the current CRS and fetches an instruction at the call instruction target address if the instruction is a call instruction. The microprocessor pops a second return address from the current CRS and fetches an instruction at the second return address, if the instruction is a return instruction.

25 Claims, 10 Drawing Sheets

Fig. 7a

| instruction activity | return address | counter | | | | stack depth | pointer | | instruction pointer |
|---|---|---|---|---|---|---|---|---|---|
| | | c0 | c1 | c2 | c3 | | non-spec | spec | |
| initialization | n/a | 0 | 0 | 0 | 0 | 0 | 0 | 0 | 0x100 |
| initial instruction addesss | n/a | 0 | 0 | 0 | 0 | 0 | 0 | 0 | 0x104 |
| fast call fetched | 0x108 | 0 | 0 | 0 | 0 | 1 | 0 | 0 | 0x300 |
| conditional branch A fetched (target addr 0xC80) | n/a | 1 | 0 | 0 | 0 | 1 | 0 | 0 | 0xC80 |
| fast return fetched | n/a | 1 | 0 | 0 | 0 | 0 | 0 | 1 | 0x108 |
| conditional branch A retired; branch not taken | n/a | 0 | 0 | 0 | 0 | 0 | 0 | 0 | 0x304 |

Fig. 7b

| instruction activity | return address | counter | | | | stack depth | pointer | | instruction pointer |
|---|---|---|---|---|---|---|---|---|---|
| | | c0 | c1 | c2 | c3 | | non-spec | spec | |
| fetch unit initial fetch address | | 0 | 0 | 0 | 0 | 0 | 0 | 0 | 0x220 |
| fast call fetched | 0x224 | 0 | 0 | 0 | 0 | 1 | 0 | 0 | 0x600 |
| other instruction | n/a | 0 | 0 | 0 | 0 | 1 | 0 | 0 | 0x604 |
| fast call fetched | 0x608 | 0 | 0 | 0 | 0 | 2 | 0 | 0 | 0x700 |
| other instruction | n/a | 0 | 0 | 0 | 0 | 2 | 0 | 0 | 0x704 |
| other instruction | n/a | 0 | 0 | 0 | 0 | 2 | 0 | 0 | 0x708 |
| conditional branch B fetched (target addr 0xD80) | n/a | 1 | 0 | 0 | 0 | 2 | 0 | 0 | 0x70C |
| fast return fetched | n/a | 1 | 0 | 0 | 0 | 1 | 0 | 1 | 0x608 |
| conditional branch B retired; branch not taken | n/a | 0 | 0 | 0 | 0 | 1 | 1 | 1 | 0x60C |
| fast return fetched | n/a | 0 | 0 | 0 | 0 | 0 | 1 | 1 | 0x224 |

Fig. 7c

| instruction activity | return address | counter | | | | stack depth | pointer | | instruction pointer |
|---|---|---|---|---|---|---|---|---|---|
| | | c0 | c1 | c2 | c3 | | non-spec | spec | |
| fetch unit initial fetch address | | 0 | 0 | 0 | 0 | 0 | 1 | 1 | 0x540 |
| fast call fetched | 0x544 | 0 | 0 | 0 | 0 | 1 | 1 | 1 | 0x580 |
| conditional branch C fetched (target addr 0xE60) | n/a | 0 | 1 | 0 | 0 | 1 | 1 | 1 | 0x584 |
| fast call fetched | 0x588 | 0 | 1 | 0 | 0 | 2 | 1 | 2 | 0x5D0 |
| fast return fetched | n/a | 0 | 1 | 0 | 0 | 1 | 1 | 2 | 0x588 |
| fast return fetched | n/a | 0 | 1 | 0 | 0 | 0 | 1 | 2 | 0x544 |
| conditional branch C retired; branch not taken | n/a | 0 | 0 | 0 | 0 | 0 | 2 | 2 | 0x548 |
| exception condition | n/a | 0 | 0 | 0 | 0 | 0 | 0 | 0 | TBD | time →

APPARATUS AND METHOD FOR FAST CORRECT RESOLUTION OF CALL AND RETURN INSTRUCTIONS USING MULTIPLE CALL/RETURN STACKS IN THE PRESENCE OF SPECULATIVE CONDITIONAL INSTRUCTION EXECUTION IN A PIPELINED MICROPROCESSOR

CROSS REFERENCE TO RELATED APPLICATIONS

This application claims priority to U.S. Provisional Application 61/157,351, filed Mar. 4, 2009, which is hereby incorporated by reference herein for all purposes.

This application is related to co-pending U.S. patent application Ser. No. 12/481,199 entitled MICROPROCESSOR WITH FAST EXECUTION OF CALL AND RETURN INSTRUCTIONS, which is concurrently filed herewith, and which has a common assignee and common inventors, and which is incorporated by reference herein for all purposes.

FIELD OF THE INVENTION

The present invention relates in general to microprocessors, and more particularly to processing of call and return instructions in a pipelined microprocessor.

BACKGROUND OF THE INVENTION

Programs frequently include subroutine call (call) instructions and return from subroutine (return) instructions. A call instruction causes a change in program flow from the current routine, or instruction sequence, to a different instruction sequence, or subroutine, than the routine currently being fetched and executed. A call instruction specifies a call address, or target address, which is the address of the first instruction of the subroutine. Additionally, the call instruction instructs the processor to save the address of the next instruction following the call instruction, referred to as the return address. A return instruction also causes a change in program flow to a different instruction sequence than the instruction sequence currently being fetched and executed. However, a return instruction specifies no target address explicitly. Instead, a return instruction instructs the processor to use the most recently saved return address as the address of the first instruction of the different instruction sequence, or the routine that called the now-returning subroutine. The return instruction in the subroutine causes the processor to begin fetching at the instruction that follows the most recently executed call instruction.

Call and return instructions update architectural state of the system. For example, in a conventional processor such as an x86 architecture processor, a call instruction updates an architectural stack pointer register and updates memory (i.e., pushes a return address onto a stack in memory at the stack pointer value). A return instruction updates the architectural stack pointer register.

Many conventional processors also speculatively execute instructions. That is, when the conventional processor encounters a conditional branch instruction it predicts the branch instruction outcome (i.e., direction and target address) and continues fetching and executing instructions based on the prediction. If a call or return instruction happens to be in the predicted path of instructions, the processor does not update the architectural state associated with the call or return instruction until it is no longer executing speculatively, i.e., until it has resolved all outstanding conditional branches older than the call or return instruction. To accomplish this, a conventional processor sends the call and return instructions down to its execution units and updates the architectural state associated with the call or return instruction only after the execution units have resolved all outstanding conditional branches older than the call or return instruction. Thus, call and return instructions like other instructions, such as conditional branch instructions, flow through the various processor pipeline stages, including the execution and retirement stags, in order to be executed and retired. Consequently, the call and return instructions incur the same latency that other instructions incur in terms of clock cycles. Furthermore, the call and return instructions consume precious resources, for example execution unit slots, register alias table entries, reservation station entries, or reorder buffer entries.

Therefore, what is needed is a microprocessor with an improved technique for allowing programs to call subroutines and return from subroutines.

BRIEF SUMMARY OF INVENTION

In one aspect, the present invention provides a method for a fetch unit of a microprocessor to correctly resolve a call or return instruction rather than issuing the call or return instruction to execution units of the microprocessor to resolve the instruction. The microprocessor has a plurality of call/return stacks (CRS). The method includes fetching a call or return instruction. The method includes determining whether a state exists, in response to fetching, the state including that the call or return instruction is the first call or return instruction the fetch unit fetches after fetching a conditional branch instruction that the execution units have yet to resolve. The method includes copying the contents of a current one of the plurality of CRS to another one of the plurality of CRS and designating the other one of the plurality of CRS as the current one of the plurality of CRS, if the state exists. After determining and, if the state exists, the microprocessor copies and designates. If the call or return instruction is a call instruction, the microprocessor pushes a first return address onto the current one of the plurality of CRS and fetches an instruction at a target address the call instruction specifies. The first return address is an address of a next sequential instruction after the call instruction. If the call or return instruction is a return instruction, the microprocessor pops a second return address from the current one of the plurality of CRS and fetches an instruction at the second return address.

In another aspect, the present invention provides a microprocessor, including execution units, configured to resolve conditional branch instructions. The microprocessor includes a plurality of call/return stacks (CRS). The microprocessor also includes a fetch unit, coupled to the plurality of call/return stacks (CRS), configured to fetch a call or return instruction. The fetch unit is further configured to determine whether a state exists. The state includes that the call or return instruction is the first call or return instruction the fetch unit fetches after it has fetched a conditional branch instruction that the execution units have yet to resolve. The fetch unit is further configured to copy the contents of a current one of the plurality of CRS to another one of the plurality of CRS and designate the other one of the plurality of CRS as the current one of the plurality of CRS, if the state exists. After the fetch unit determines whether the state exists, the microprocessor copies and designates. If the call or return instruction is a call instruction, the fetch unit pushes a first return address onto the current one of the plurality of CRS and fetches an instruction at a target address the call instruction specifies. The first return address is an address of a next sequential instruction after the call instruction. If the call or return instruction is a return instruction, the fetch unit pops a second return address from the current one of the plurality of CRS and fetches an instruction at the second return address.

In yet another aspect, the present invention provides a computer program product for use with a computing device. The computer program product includes a computer usable storage medium. The computer usable storage medium has computer readable program code embodied in the medium for specifying a microprocessor that immediately resolves call and return instructions in a fetch unit of the microprocessor rather than issuing the call and return instructions to execution units of the microprocessor. The computer readable program code includes a first program code for specifying a plurality of call/return stacks (CRS). The computer readable program code includes a second program code for specifying a fetch unit, coupled to the plurality of call/return stacks (CRS), configured to fetch a call or return instruction. The fetch unit is further configured to determine whether a state exists, in response to fetching the call or return instruction. The fetch unit is further configured to copy the contents of a current one of the plurality of CRS to another one of the plurality of CRS and designate the other one of the plurality of CRS as the current one of the plurality of CRS, if the state exists. The state includes the call or return instruction is the first call or return instruction the fetch unit fetches after it fetches a conditional branch instruction that the execution units have yet to resolve. After the fetch unit determines whether the state exists, the microprocessor copies and designates. If the call or return instruction is a call instruction, the fetch unit pushes a first return address onto the current one of the plurality of CRS and fetches an instruction at a target address the call instruction specifies. The first return address is an address of a next sequential instruction after the call instruction. If the call or return instruction is a return instruction, the fetch unit pops a second return address from the current one of the plurality of CRS and fetches an instruction at the second return address.

An advantage of the present invention is that because the fetch unit (which may be the microcode unit) executes and retires fast call and return instructions without dispatching them to the execution pipeline, the fast call and return instructions are potentially executed with less latency than conventional call and return instructions. Furthermore, the correct execution of fast call and return instructions by the fetch unit eliminates mispredictions and corrections of conventional call and return instructions. Another advantage is that potentially fewer resources of the microprocessor are used to resolve and retire the fast call and return instructions than a conventional conditional call or return instruction. For example, because the fast call or return instruction is not dispatched to the execution pipeline, the fast call or return instruction does not occupy entries in the register alias table, reservation stations, execution units, or reorder buffer.

BRIEF DESCRIPTION OF THE DRAWINGS

FIGS. 7*a*, 7*b*, and 7*c* are tables illustrating the operation of the microprocessor of FIG. 1 to process program sequences according to the present invention.

DETAILED DESCRIPTION OF THE INVENTION

Figure 1:
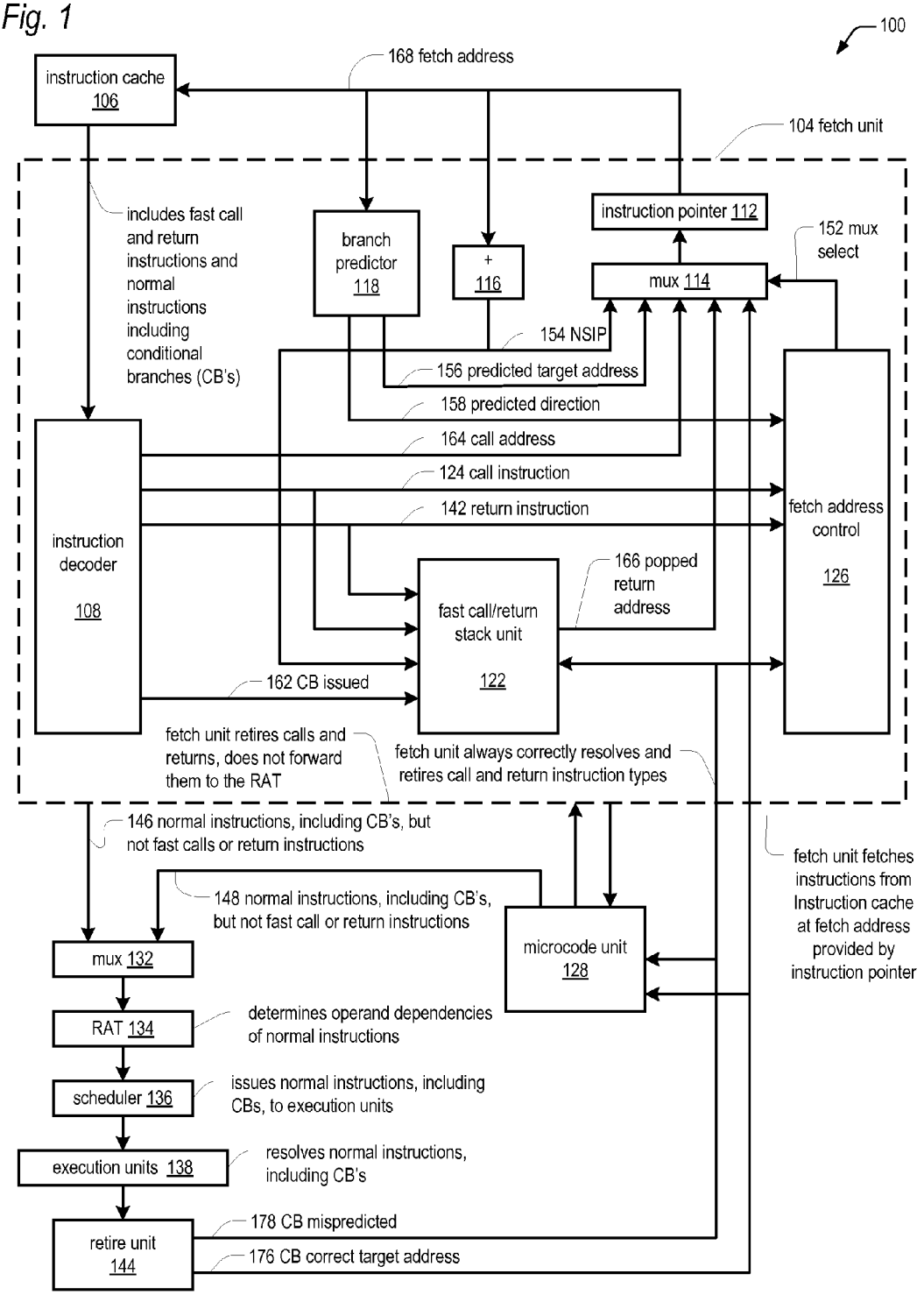
FIG. 1 is a block diagram illustrating a microprocessor of the present invention.

Referring now to FIG. 1, a block diagram illustrating a microprocessor 100 of the present invention is shown. Microprocessor 100 includes a fetch unit 104, which fetches program instructions from an instruction cache 106. The fetch unit 104 fetches instructions from the instruction cache 106 at a fetch address 168 that an instruction pointer register 112 provides to the instruction cache 106. The fetched program instructions may include user program instructions, such as of an operating system or application program. The fetched instructions include normal instructions, including conditional branch instructions (CBs). The fetched instructions also include fast call and return instructions according to the present invention. Normal instructions are program instructions that are executed and retired by execution units 138 and a retire unit 144 of the microprocessor 100. In contrast, a fast call or return instruction is a program instruction that is resolved and retired by the fetch unit 104 or a microcode unit 128 of the microprocessor 100, rather than by the execution units 138 and retire unit 144 of the microprocessor 100, as described herein.

The fetch unit 104 also includes a branch predictor 118. The branch predictor 118 generates a predicted target address 156 to the fetch unit mux 114 and a predicted direction 158 to the fetch address control 126 in response to the instruction pointer 112 of the fetch unit 104 generating a fetch address 168 to the instruction cache 106. In particular, the branch predictor 118 indicates to the fetch address control 126 whether the predicted target address 156 and predicted direction 158 are valid based on whether the fetch address 168 specifies a cache line that previously included a conditional branch instruction.

In one embodiment, the branch predictor 118 includes a branch target cache (not shown). When the fetch address 168 hits in the branch target cache, the branch predictor 118 generates the predicted target address 156 and predicted direction 158 to the fetch address control 126. The microprocessor 100 updates the branch target cache with the addresses and resolved target addresses of previously executed conditional branch instructions. Furthermore, the microprocessor 100 updates the branch target cache with direction prediction information based on the resolved direction of the previously executed conditional branch instructions.

The fetch unit 104 reads program instructions from the instruction cache 106, and transfers the fetched program instructions to an instruction decoder 108. The instruction decoder 108 decodes the fetched instructions, and determines if each fetched instruction should be issued to the execution pipeline of the microprocessor 100, or executed and retired within the fetch unit 104. Herein, the execution pipeline refers to the portion of the pipeline in FIG. 1 below the fetch unit 104 and microcode unit 128, i.e., the mux 132, the register alias table (RAT) 134, instruction scheduler 136, execution units 138, and retire unit 144. A conditional branch instruction is an example of a normal instruction 146 that the instruction decoder 108 issues to the execution units. In parallel with issuing a conditional branch instruction 146 to the execution units of the microprocessor 100, the instruction decoder 108 also generates a CB issued 162 indication to a fast call/return stack unit 122 of the fetch unit 104. The operation of the CB issued 162 indication will be described later with reference to the fast call/return stack unit 122.

The instruction decoder 108 transfers normal instructions 146 to a mux 132, which selects between normal instructions 146 from the fetch unit 104 and normal instructions 148 from a microcode unit 128. The microcode unit 128 provides normal instructions 148 to mux 132, and will be described in more detail with respect to FIG. 8. Mux 132 transfers normal instructions 146/148 to the RAT 134.

The RAT 134 determines operand dependencies for all normal instructions 146/148. A current normal instruction 146/148 in the RAT 134 may have one or more operands that depend from results of previously executed normal instructions 146/148. The RAT 134 identifies these operand dependencies to a scheduler 136. In the case of a conditional branch instruction 146, an operand dependency exists for a previous instruction that generates a result that is used to resolve the branch condition or target address of the conditional branch instruction 146.

The scheduler 136 schedules normal instructions 146/148 for execution. The scheduler 136 waits until the required operands are available before the scheduler 136 issues the normal instructions 146/148 for execution. In the case of a conditional branch instruction 146, the result of a previous normal instruction 146 that will be compared to the branch condition in the conditional branch instruction 146 must be available before the scheduler 136 issues the conditional branch instruction 146 for execution. The scheduler 136 transfers normal instructions 146/148 with all operands available to execution units 138 of the microprocessor 100.

The execution units 138 execute normal instructions 146/148. For a conditional branch instruction 146, the execution units 138 calculate the correct branch direction and target address. The execution units 138 then compare the calculated correct branch direction to the predicted direction 158 that accompanies the conditional branch instruction 146 down the execution pipeline and compare the calculated correct branch target address to the predicted target address 156 that accompanies the conditional branch instruction 146 down the execution pipeline. If the predicted values match the correct values, the branch predictor 118 correctly predicted the branch and the fetch unit 104 fetched proper instructions after fetching the conditional branch instruction 146. Otherwise, the branch predictor 118 incorrectly predicted the branch, and the fetch unit 104 fetched wrong instructions after fetching the conditional branch instruction 146, in which case the misprediction must be corrected. The execution units 138 transfers the results, including conditional branch instruction misprediction information, of all executed normal instructions 146/148 to a retire unit 144.

The retire unit 144 is architecturally at the end of the execution pipeline, and writes back the execution results to architectural registers of the microprocessor 100 and retires normal instructions 146/148. The execution pipeline of microprocessor 100 includes the mux 132, RAT 134, scheduler 136, execution units 138, and retire unit 144. In the case of conditional branch instructions 146, the retire unit 144 generates a CB mispredicted 178 indication to the fetch unit 104 and the microcode unit 128. The CB mispredicted 178 indication is true if the branch predictor 118 mispredicted the branch. In this case, the retire unit 144 also generates a CB correct target address 176. The CB correct target address 176 is the branch target address specified in the conditional branch instruction 146 if the execution units 138 resolved the branch as taken, or is the next sequential address following the conditional branch instruction 146 if the execution units 138 resolved the branch as not taken. Misprediction of a conditional branch instruction 146 causes the microprocessor 100 to flush all instructions newer than (i.e. following in program order) the conditional branch instruction 146 from the execution pipeline of the microprocessor 100 and to start fetching instructions from the CB correct target address 176 generated by the retire unit 144.

The fetch address control 126 in the fetch unit 104 receives the CB mispredicted 178 indication and the CB correct target address 176 from the retire unit 144. The mux select 152 controls the fetch unit mux 114 address to select one of several possible addresses at which the fetch unit 104 fetches instructions from the instruction cache 106. The fetch unit mux 114 loads the selected address into the instruction pointer 112. If the CB mispredicted indication 178 is true, the fetch address control 126 generates the mux select 152 to select the CB correct target address 176. If the CB mispredicted indication 178 is false, the fetch address control 126 by default generates the mux select 152 to select the next sequential IP address (NSIP) 154, unless the branch predictor 118 predicts a taken branch or the instruction decoder 108 indicates a fast call or return instruction has been encountered, as described herein. The NSIP 154 is the next sequential address following the current fetch address 168 generated by an incrementing circuit 116, and reflects normal in-order program instruction fetching.

The instruction decoder 108 fetches fast call and return instructions from the instruction cache 106. Instead of issuing a fast call or return instruction to the execution pipeline of the microprocessor 100 for execution as it does normal instructions 146, the instruction decoder 100 generates a true value on a call instruction 124 indication or a return instruction 142 indication, respectively, to the fast call/return stack unit 122 and to the fetch address control 126. Advantageously, the fast call/return stack unit 122 operates to execute and retire fast call and return instructions correctly and non-selectively (i.e., the fetch unit 104 never dispatches fast call and return instructions to the execution units 138, regardless of the circumstances) within the fetch unit 104, and does not forward fast call instructions or return instructions to the execution pipeline of the microprocessor 100. In particular, the fast call/return stack unit 122 includes and updates the relevant architectural state to execute and retire fast call and return instructions, as described herein. Thus, the microprocessor 100 of the present invention advantageously correctly executes and retires fast call and return instructions sooner in the pipeline and in fewer clock cycles than it would a normal call or return instruction that must be dispatched to the execution pipeline. It should be noted that the early execution and retirement of fast call and return instructions as described herein is distinguished from the prediction of call and return instructions, which is well-known in the art of processor design. In a conventional microprocessor that predicts call and return instructions, the conventional microprocessor must ultimately correctly resolve the call or return instruction after predicting it and correct any misprediction by flushing incorrectly fetched instructions and fetching at the correct target address, i.e., the correct call or return address. In contrast, the fast call/return stack unit 122 of the present invention advantageously always correctly executes and resolves fast call and return instructions within the fetch unit 104 such that the execution units 138 and retire unit 144 need not correctly execute fast call and return instructions nor correct a misprediction by the fast call/return stack unit 122, since the fast call/return stack unit 122 does not predict the fast call and return instructions.

The instruction decoder 108 also provides the call instruction 124 indication and return instruction 142 indication to the fetch address control 126. The instruction decoder 108 also provides the call address 164 to the fetch unit mux 114. The fast call/return stack unit 122 also receives the CB issued 162 indication from the instruction decoder 108 and the CB mispredicted 178 indication from the retire unit 144. Finally, the fast call/return stack unit 122 provides a popped return address 166 to the fetch address control 126. The fast call/return stack unit 122 and its operation will be described in more detail with respect to the block diagrams of FIGS. 2 and 7a-c, and the flowcharts of FIGS. 3-6.

Figure 2:
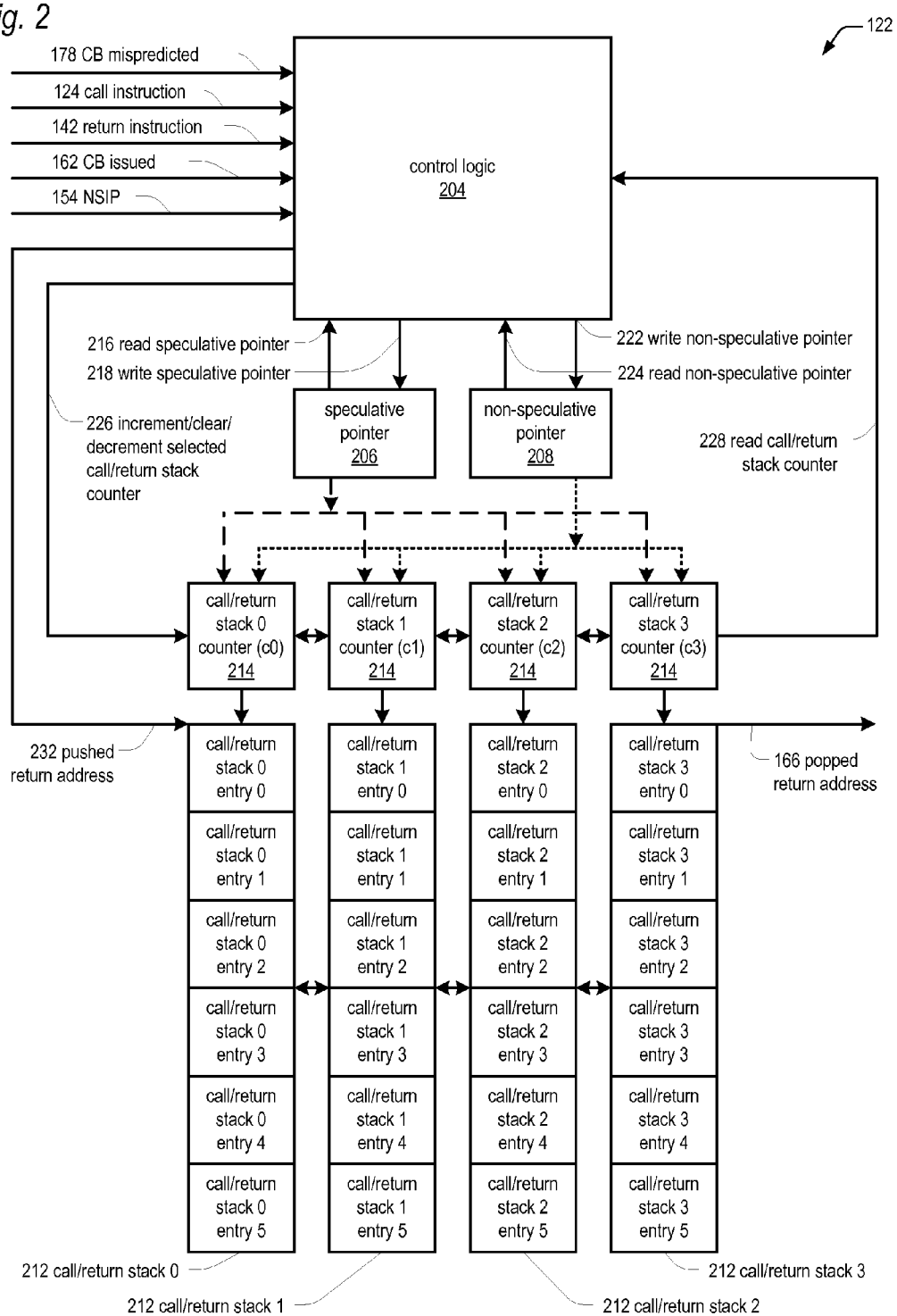
FIG. 2 is a block diagram of the fast call/return stack unit of FIG. 1 according to the present invention.

Referring now to FIG. 2, a block diagram of the fast call/return stack unit 122 of FIG. 1 according to the present invention is shown. The fast call/return stack unit 122 includes a plurality of call/return stacks 212 (hereinafter referred to as CRS 212), shown as call/return stack 0 212 through call/return stack 3 212. In one embodiment, the fast call/return stack unit 122 includes four CRS 212. Other embodiments are contemplated in which there are more or fewer CRS 212 than four, although all embodiments include a plurality of CRS 212 in the fast call return stack unit 122.

Each CRS 212 includes an equal plurality of entries, each entry configured to store a return address from a fast call instruction. In one embodiment, there are eight call/return stack entries in each CRS 212 (although only six entries are shown in FIG. 2), although other embodiments are contemplated in which there are more or fewer entries than eight in each CRS 212. The number of entries in a CRS 212 is a design decision made by taking into account the desired maximum number of fast call instructions that may be executed by a program (without an intervening fast return instruction) versus the amount of microprocessor 100 real estate and power consumed by the CRS 212. When the fast call/return stack unit 122 executes a call instruction, it pushes the return address onto the appropriate one of the plurality of CRS 212, and when the fast call/return stack unit 122 executes a fast return instruction it pops a return address off the appropriate one of the plurality of CRS 212, as described herein. The fast call/return stack unit 122 includes a stack pointer (not shown) for each CRS 212 that indicates the top of each CRS 212 used for pushing and popping a return address.

Each CRS 212 has a corresponding call/return stack counter 214 assigned (hereinafter referred to as CRSC 214), such that the fast call/return stack unit 122 includes the same number of CRS 212 as CRSC 214. Each of the CRSC 214 maintains a count of the unresolved conditional branch instructions 146 that were dispatched by the fetch unit 104 to the execution pipeline while the corresponding CRS 212 was the current CRS 212. Stated alternatively, each CRSC 214 maintains a count of the unresolved conditional branch instructions 146 seen during the level of speculation associated with the corresponding CRS 212. In one embodiment, each CRSC 214 is a 6-bit counter and can count up to 64 unresolved conditional branch instructions. In other embodiments, there may be fewer or more bits in the CRSC 214. An unresolved conditional branch instruction 146 is a conditional branch instruction 146 which the execution units 138 have not yet resolved and the retire unit 144 has not yet retired. That is, the execution units 138 have not yet determined the correct branch direction and target address, and the retire unit 144 has not yet generated a true or false value on the CB mispredicted indication 178 of FIG. 1 for the conditional branch instruction to indicate whether the conditional branch instruction was correctly or incorrectly predicted.

The fast call/return stack unit 122 includes a speculative pointer 206 and a non-speculative pointer 208, each storing a value that identifies a CRS 212 of the plurality of CRS 212. The speculative pointer 206 identifies the current one of the CRS 212, i.e., the CRS 212 to which a return address is pushed or popped in response to a fast call or return instruction, respectively. The non-speculative pointer 208 identifies one of the CRS 212 that contains return addresses associated only with unretired call instructions that are older in program order than all unresolved conditional branch instructions 146. In other words, as discussed below with respect to block 626 of FIG. 6, the non-speculative pointer 208 points to the CRS 212 to which the fetch unit 104 reverts in the event that a conditional branch instruction 146 is resolved as incorrectly predicted.

The fast call/return stack unit 122 also includes control logic 204, which controls reads, writes, increment operations, decrement operations, and clear operations to the CRS 212, CRSC 214, speculative pointer 206, and non-speculative pointer 208. The control logic 204 generates a pushed return address 232 to the current CRS 212 indicated by the speculative pointer 206, in response to receiving the call instruction 124 indication from the instruction decoder 108 of FIG. 1. The value of the pushed return address 232 is the address immediately following the call instruction address, which is the NSIP 154 when the address of the call instruction is the fetch address 168 of FIG. 1. The control logic 204 causes the current CRS 212 indicated by the speculative pointer 206 to generate the popped return address 166 of FIG. 1 to the fetch unit mux 114, in response to receiving the return instruction 142 indication of FIG. 1 from the instruction decoder 108. The control logic 204 also reads each of the CRSC 214 via read call/return stack counter signals 228, and writes the CRSC via increment/clear/decrement selected call/return stack counter signals 226.

The control logic 204 reads the speculative pointer 206 via signals 216 to make control decisions based on the speculative pointer 206 value, and writes the speculative pointer 206 via signals 216 based on the control decisions. The control logic 204 also reads the non-speculative pointer 208 via signals 224 to make control decisions based on the non-speculative pointer 208 value, and writes the non-speculative pointer 208 via signals 222 based on the control decisions. The control decisions and detailed operation of the fast call/return stack unit 122 are described in the flowcharts in FIGS. 3-6 and the block diagrams in FIGS. 7a-c.

The CRS 212 and CRSC 214, taken as a whole, are part of the architectural state of the microprocessor 100 associated with fast call and return instructions. Thus, when the fast call/return stack unit 122 updates the CRS 212 in response to the fetch unit 104 decoding a fast call or return instruction, the fast call or return instruction has been correctly executed and retired by the fetch unit 104. The CRS 212 and CRSC 214 are only modifiable, albeit indirectly, by fast call and return instructions of the microprocessor 100 instruction set architecture; in contrast, the CRS 212 and CRSC 214 are not modifiable by other instructions of the instruction set architecture. This is in contrast to other conventional processors whose architectural state associated with conventional call and return instructions may be modified by instructions of the instruction set architecture other than call and return instructions. For example, in the x86 architecture, the architectural state associated with CALL and RET instructions is an architectural stack pointer register and memory, which may be modified by other instructions of the instruction set architecture such as PUSH, POP, ENTER, LEAVE, and MOV instructions. Furthermore, the instruction set architecture imposes a restraint upon programs that include fast call and return instructions such that for each executed fast return instruction, the program must previously have executed a corresponding fast call instruction.

As discussed above, the CRS 212 are not used for predicting return addresses of fast return instructions. Thus, the CRS 212 are not to be confused with call/return stacks that are used to predict a return address as is well known in the art of processor design, such as the internal call/return stack described in U.S. Pat. No. 6,314,514 entitled METHOD AND APPARATUS FOR CORRECTING AN INTERNAL CALL/RETURN STACK IN A MICROPROCESSOR THAT SPECULATIVELY EXECUTES CALL AND RETURN INSTRUCTIONS. The internal call/return stack of U.S. Pat. No. 6,314,514 is not part of the architectural state of the system; rather, the architectural state that stores return addresses in the system of U.S. Pat. No. 6,314,514 is system memory, and the internal call/return stack is simply an attempt to keep a cached version of the architectural state in system memory. However, the internal call/return stack may become inconsistent with the architectural state in system memory. Thus, the return address provided by the internal call/return stack is a prediction that may require correction, resulting in potentially many lost clock cycles. That is, the predicted return address provided by the internal call/return stack may require correction because the contents of the non-architectural state internal call/return stack may become inconsistent with the architectural stack in system memory in spite of the attempts by the invention of U.S. Pat. No. 6,314,514 to keep it consistent with the architectural stack in system memory. In contrast, the CRS 212 taken as a whole of the present invention are included in the architectural state of the microprocessor 100 associated with fast call and return instructions.

It is noted that embodiments of the present invention are contemplated in which, in addition to the fast call and return instructions described herein, the instruction set architecture of the microprocessor 100 may include normal call and return instructions whose architectural state is different from the architectural state associated with fast call and return instructions. In one embodiment, the architectural state associated with the normal call and return instructions of the instruction set architecture of the microprocessor 100 includes a stack in system memory specified by an architectural stack pointer register. Furthermore, the fetch unit 104 is configured to distinguish between normal call and return instructions and fast call and return instructions. In particular, the fetch unit 104 dispatches normal call and return instructions to the execution pipeline for execution and retirement, but itself correctly executes and retires fast call and return instructions. In one embodiment, the normal call and return instructions are x86 architecture CALL and RET instructions. Unless otherwise indicated from the context, a call or return instruction referred to in the description of the embodiments of the present invention is a fast call or return instruction, respectively, rather than a normal call or return instruction.

Figure 3:
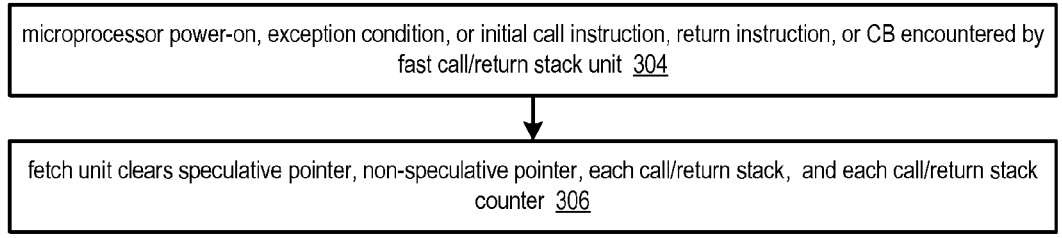
FIG. 3 is a flowchart illustrating the initialization sequence for the fast call/return stack unit according to the present invention.

Referring now to FIG. 3, a flowchart illustrating the initialization sequence for the fast call/return stack unit 122 according to the present invention is shown. Flow begins at block 304.

At block 304, the microprocessor 100 is either powered-up, an exception occurs, or the fast call/return stack unit 122 receives a first call instruction 124, first return instruction 142, or first CB issued 162 indication. Flow proceeds to block 306.

At block 306, the fetch unit 104 clears the speculative pointer 206, the non-speculative pointer 208, the plurality of CRS 212, and the plurality of CRSC 214. Flow ends at block 306.

Figure 4:
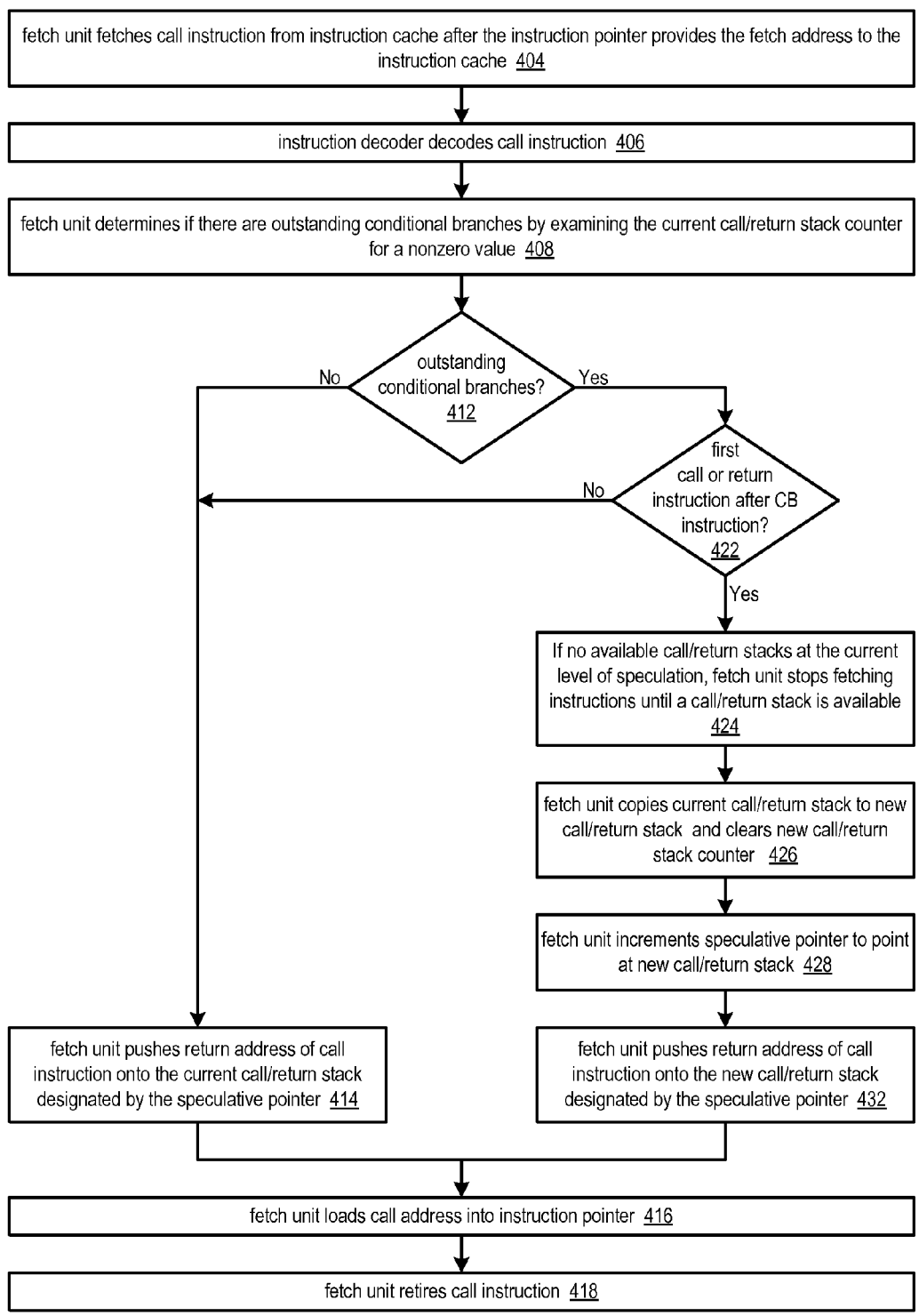
FIG. 4 is a flowchart illustrating operation of the fetch unit of FIG. 1 to process a fast call instruction according to the present invention.

Referring now to FIG. 4, a flowchart illustrating operation of the fetch unit 104 of FIG. 1 to process a fast call instruction according to the present invention is shown. Flow begins at block 404.

At block 404, the fetch unit 104 fetches a fast call instruction from the instruction cache 106 after the instruction pointer 112 provides the fetch address 168 to the instruction cache 106. Flow proceeds to block 406.

At block 406, the instruction decoder 108 decodes the fetched fast call instruction and generates the call instruction 124 indication to the fast call/return stack unit 122 and the fetch address control 126. The instruction decoder 108 also extracts or computes the call address 164 from the decoded call instruction and provides it to the mux 114. Flow proceeds to block 408.

At block 408, the fetch unit 104 examines the current CRSC 214 for a nonzero value in order to determine if there are outstanding conditional branch instructions associated with the current level of speculation. If the selected CRSC 214 contains a nonzero value, then there are outstanding conditional branch instructions 146. If the selected CRSC 214 contains a zero value, then there are no outstanding conditional branch instructions 146. Flow proceeds to decision block 412.

At decision block 412, if there are outstanding conditional branch instructions 146, then flow proceeds to decision block 422; otherwise, flow proceeds to block 414.

At block 414, the fetch unit 104 pushes the return address of the fast call instruction onto the current CRS 212 indicated by the speculative pointer 206. Control logic 204 in the fast call/return stack unit 122 reads the speculative pointer 206 to determine the current CRS 212, writes the pushed return address 232 (which is the NSIP 154) to the CRS 212 corresponding to the value read from the speculative pointer 206, and updates the stack pointer of the current CRS 212 accordingly. In one embodiment, if the push of the return address would cause an overflow of the current CRS 212, the microprocessor 100 generates a stack overflow exception. The exception handler saves the contents of the current CRS 212 to memory to free up space for the return address. Conversely, if the pop of a return address at block 514 of FIG. 5 would cause an underflow of the current CRS 212, the microprocessor 100 generates a stack underflow exception. The exception handler restores the contents of the current CRS 212 from memory. In this embodiment, the exception generation and handling might offset the benefits of the fast call and return instructions described herein if an ill-behaved program generated a relatively large number of exceptions; however, well-behaved programs (i.e., written to avoid executing more consecutive fast call instructions without an intervening fast return instruction than the depth of a CRS 212) still benefit from the fast call and return instructions. Flow proceeds to block 416.

At block 416, the fetch address control 126 controls the mux 114 via mux select 152 to load the call address 164 into the instruction pointer 112 in response to the call instruction 124 indication, such that the next instruction is fetched from the instruction cache 106 at the call address 164. Flow proceeds to block 418.

At block 418, the fetch unit 104 retires the fast call instruction. In particular, the fast call instruction is not dispatched to the execution pipeline. Flow ends at block 418.

At decision block 422, the fetch unit 104 determines if the fast call instruction is the first fast call or return instruction fetched after a conditional branch instruction 146. The instruction decoder 108 generates a true CB issued 162 indication to the fast call/return stack unit 122 to notify the fast call/return stack unit 122 when it dispatches a conditional branch instruction 146 to the execution pipeline, and the retire unit 144 notifies the fast call/return stack unit 122 when it retires a conditional branch instruction. This enables the control logic 204 to keep track of the number of fast call or return instructions dispatched since the last CB issued 162 indication, and in particular, whether any fast call or return instructions have been dispatched since the fetch unit 104 issued the last conditional branch instruction. If the call instruction is the first fast call or return instruction dispatched since the last CB issued 162 indication, then the speculation level has increased and flow proceeds to block 424; otherwise, the speculation level has not increased and flow proceeds to block 414.

At block 424, if there is no available CRS 212 at the current level of speculation, the fetch unit 104 stops fetching instructions and suspends processing of the fast call instruction until a CRS 212 becomes available. There is no available CRS 212 at the current level of speculation if incrementing the speculative pointer 206 at block 428 (or at block 528 of FIG. 5) would make its value equal to the non-speculative pointer 208 value. As discussed below, the fast call/return stack unit 122 allocates a new CRS 212 at block 426 when a first fast call instruction is decoded (or at block 526 of FIG. 5 when a fast return instruction is decoded) after the instruction decoder 108 issues a conditional branch instruction 146 to the execution pipeline, which makes the newly allocated CRS 212 unavailable for allocation. Conversely, a CRS 212 may be made available for allocation when a conditional branch instruction 146 is resolved. In particular, when a conditional branch instruction is mispredicted, one or more CRS 212 may be made available because the speculative pointer 206 is updated at described below with respect to block 626 of FIG. 6. Additionally, when a conditional branch instruction is resolved as correctly predicted, if other conditions are satisfied, a CRS 212 is made available because the non-speculative pointer 208 is updated at described below with respect to block 624 of FIG. 6. Flow proceeds to block 426.

At block 426, the fetch unit 104 allocates a new CRS 212, copies the contents of the current CRS 212 to the newly allocated CRS 212, and clears the new CRSC 214. In particular, the return addresses in the current CRS 212 are copied to the newly allocated CRS 212. Flow proceeds to block 428.

At block 428, the fetch unit 104 increments the speculative pointer 206 to point at the newly allocated CRS 212. The level of speculation increases when the fetch unit 104 increments the speculative pointer 206. The fetch unit 104 increments the speculative pointer 206 in a wrapping fashion such that the CRS 212 are organized as a circular queue of CRS 212. That is, for example if the number of CRS 212 is four, when the current value of the speculative pointer 206 is three, when the control logic 204 increments the speculative pointer 206, the new value is zero. The control logic 204 performs a similar wrapping increment operation with respect to the non-speculative pointer 208 at block 624 of FIG. 6. Flow proceeds to block 432.

At block 432, the control logic 204 pushes the return address 232 (which is the NSIP 154) onto the current CRS 212, i.e., the CRS 212 newly allocated at block 426 and now pointed to by the speculative pointer 206 per block 428. Flow proceeds to block 416.

Figure 5:
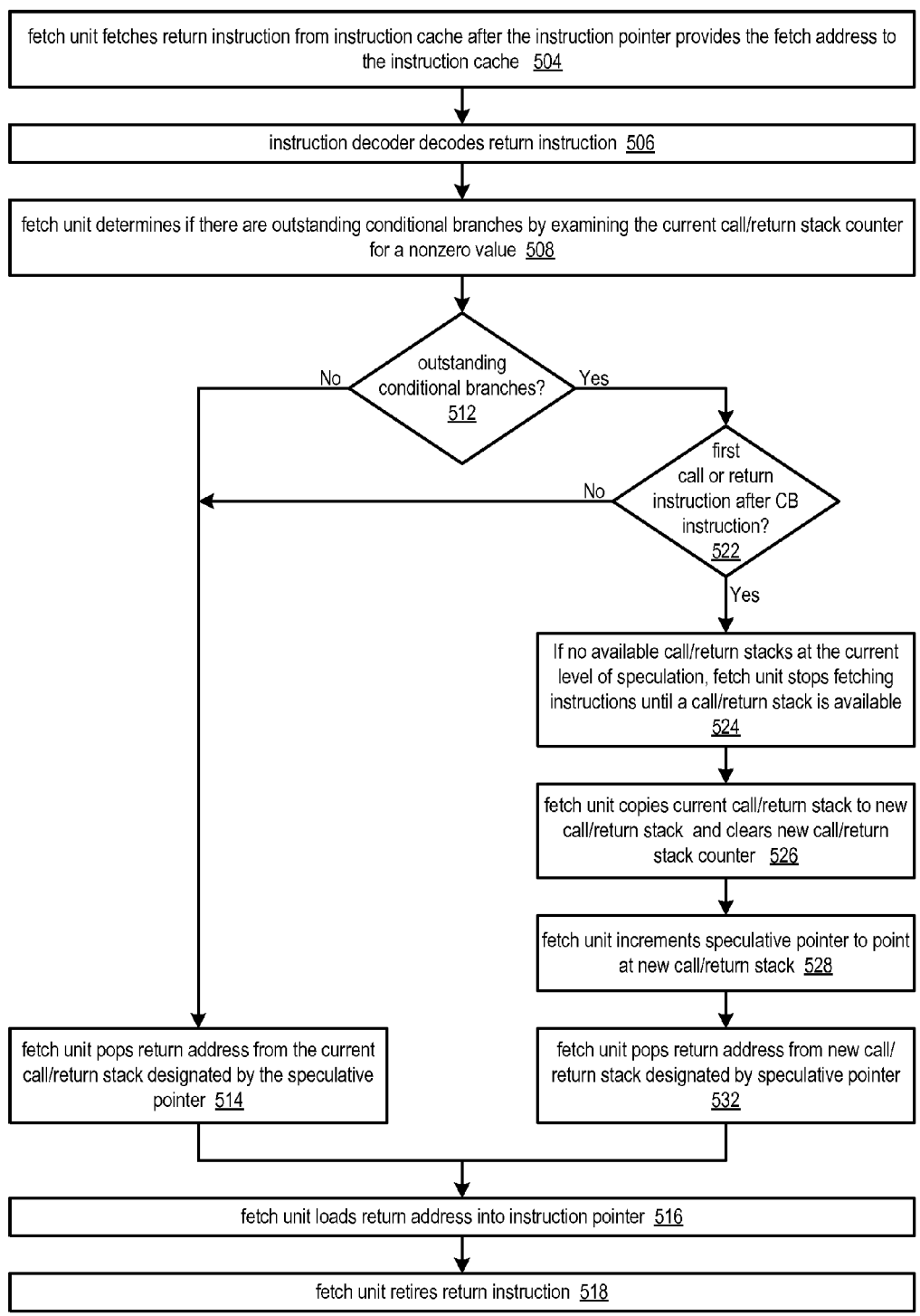
FIG. 5 is a flowchart illustrating operation of the fetch unit of FIG. 1 to process a fast return instruction according to the present invention.

Referring now to FIG. 5, a flowchart illustrating operation of the fetch unit 104 of FIG. 1 to process a fast return instruction according to the present invention is shown. Flow begins at block 504.

At block 504, the fetch unit 104 fetches a fast return instruction from the instruction cache 106 after the instruction pointer 112 provides the fetch address 168 to the instruction cache 106. Flow proceeds to block 506.

At block 506, the instruction decoder 108 decodes the fetched fast return instruction and generates the return instruction 142 indication to the fast call/return stack unit 122 and the fetch address control 126. Flow proceeds to block 508.

At block 508, the fetch unit 104 examines the current CRSC 214 for a nonzero value in order to determine if there are outstanding conditional branch instructions associated with the current level of speculation. If the selected CRSC 214 contains a nonzero value, then there are outstanding conditional branch instructions 146. If the selected CRSC 214 contains a zero value, then there are no outstanding conditional branch instructions 146. Flow proceeds to decision block 512.

At decision block 512, if there are outstanding conditional branch instructions 146 then flow proceeds to decision block 522; otherwise, flow proceeds to block 514.

At block 514, the fetch unit 104 pops the return address off the current CRS 212 indicated by the speculative pointer 206. Control logic 204 in the fast call/return stack unit 122 reads the speculative pointer 206 to determine the current CRS 212, updates the stack pointer of the current CRS 212, and reads the popped return address 166 from the CRS 212 corresponding to the value read from the speculative pointer 206 at its current stack pointer. Flow proceeds to block 516.

At block 516, the fetch address control 126 controls the mux 114 via mux select 152 to load the popped return address 166 into the instruction pointer 112 in response to the return instruction 142 indication, such that the next instruction is fetched from the instruction cache 106 at the popped return address 166. Flow proceeds to block 518.

At block 518, the fetch unit 104 retires the fast return instruction. In particular, the fast return instruction is not dispatched to the execution pipeline. Flow ends at block 518.

At decision block 522, the fetch unit 104 determines if the fast return instruction is the first fast call or return instruction fetched after a conditional branch instruction 146. If the return instruction is the first fast call or return instruction dispatched since the last CB issued 162 indication, then the speculation level has increased and flow proceeds to block 524; otherwise, the speculation level has not increased and flow proceeds to block 514.

At block 524, if there is no available CRS 212 at the current level of speculation, the fetch unit 104 stops fetching instructions and suspends processing of the fast return instruction until a CRS 212 becomes available. Flow proceeds to block 526.

At block 526, the fetch unit 104 allocates a new CRS 212, copies the contents of the current CRS 212 to the newly allocated CRS 212, and clears the new CRSC 214. In particular, the return addresses in the current CRS 212 are copied to the newly allocated CRS 212. Flow proceeds to block 528.

At block 528, the fetch unit 104 increments the speculative pointer 206 to point at the newly allocated CRS 212. Flow proceeds to block 532.

At block 532, the control logic 204 pops the return address 166 off the current CRS 212, i.e., the CRS 212 newly allocated at block 526 and now pointed to by the speculative pointer 206 per block 528. Flow proceeds to block 516.

Figure 6:
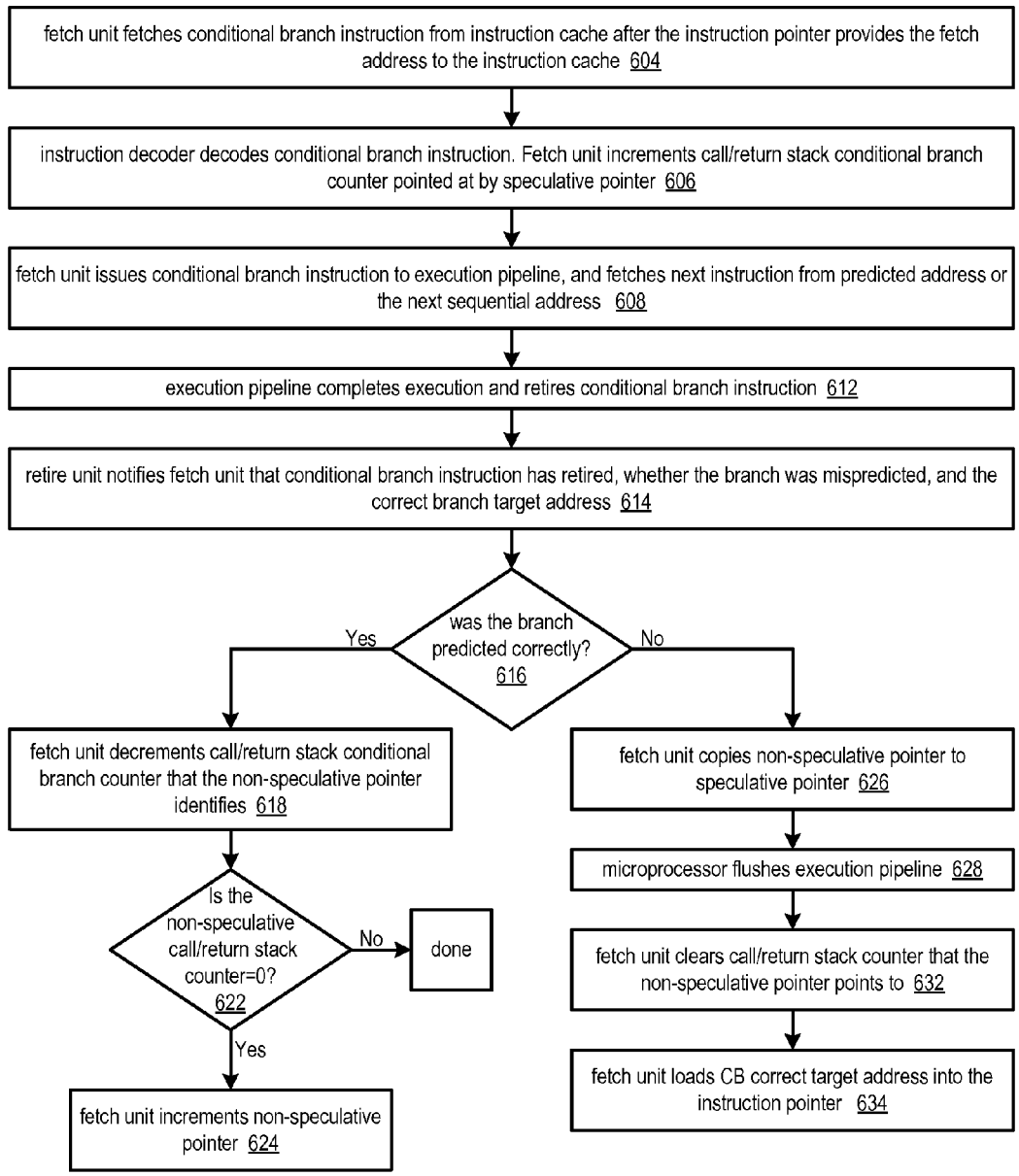
FIG. 6 is a flowchart illustrating operation of the microprocessor of FIG. 1 to process a conditional branch instruction according to the present invention.

Referring now to FIG. 6, a flowchart illustrating operation of the microprocessor 100 of FIG. 1 to process a conditional branch instruction according to the present invention is shown. Flow begins at block 604.

At block 604, the fetch unit 104 fetches a conditional branch instruction from the instruction cache 106 after the instruction pointer 112 provides the fetch address 168 to the instruction cache 106. Flow proceeds to block 606.

At block 606, the instruction decoder 108 decodes the conditional branch instruction and generates a true value on the CB issued indication 162. The fast call/return stack unit 122 responsively increments the CRSC 214 identified by the speculative pointer 206, i.e., the current CRSC 214. Each CRSC 214 stores the number of outstanding conditional branch instructions 146 for the corresponding CRS 212. Flow proceeds to block 608.

At block 608, the fetch unit 104 issues the conditional branch instruction to the execution pipeline and fetches the next instruction from the predicted target address 156 or the NSIP 154 depending upon whether the predicted direction 158 is taken or not taken. Flow proceeds to block 612.

At block 612, the execution pipeline executes and retires the conditional branch instruction 146. The execution pipeline includes the mux 132, RAT 134, scheduler 136, execution units 138, and retire unit 144. Flow proceeds to block 614.

At block 614, the retire unit 144 notifies the fetch unit 104 that the conditional branch instruction 146 is retired, whether the branch was mispredicted via the CB mispredicted 178 indication, and the correct branch target address via the CB correct target address 176, if necessary. Flow proceeds to decision block 616.

At decision block 616, the fetch unit 104 determines what to do based on the CB mispredicted 178 indication. If the CB mispredicted 178 indication is false, then the branch was predicted correctly, and flow proceeds to block 618. If the CB mispredicted 178 indication is true, then the branch was predicted incorrectly, and flow proceeds to block 626.

At block 618, the fetch unit 104 decrements the CRSC 214 pointed to by the non-speculative pointer 208 because the branch predictor 118 correctly predicted the conditional branch instruction 146 being retired. Flow proceeds to decision block 622.

At decision block 622, the fetch unit 104 determines whether the CRSC 214 decremented at block 618 contains a zero value. A zero value in a CRSC 214 indicates there are no outstanding conditional branch instructions 146 associated with the CRS 212 pointed to by the non-speculative pointer 208. If the CRSC 214 is zero, flow proceeds to block 624; otherwise, flow ends at block 622.

At block 624, the fetch unit 104 increments the non-speculative pointer 208 so that it points to the next CRS 212 in the circular queue of CRS 212. The fetch unit 104 increments the non-speculative pointer 208 in a wrapping fashion, as described earlier with respect to block 426. Flow ends at block 624.

At block 626, the fetch unit 104 copies the non-speculative pointer 208 to the speculative pointer 206 since a conditional branch instruction misprediction was detected and must be corrected. Copying the non-speculative pointer 208 to the speculative pointer 206 causes the CRS 212 identified by the non-speculative pointer 208 to be the current CRS 212. Flow proceeds to block 628.

At block 628, the microprocessor 100 flushes the execution pipeline. The fact that the mispredicted conditional branch instruction is now being retired indicates that it is the oldest instruction in the microprocessor 100. Flushing the execution pipeline purges all instructions newer in program order than the mispredicted and currently retiring conditional branch instruction 146 from the microprocessor 100. This is necessary since the fetch unit 104 fetched instructions from the incorrect path because the branch predictor 118 mispredicted the conditional branch instruction. Flow proceeds to block 632.

At block 632, the fetch unit 104 clears the current CRSC 214 since no outstanding conditional branch instructions are present in the microprocessor 100 due to the pipeline flush performed at block 628. Flow proceeds to block 634.

At block 634, the fetch unit 104 loads the CB correct target address 176 into the instruction pointer 112, in response to the true CB mispredicted 178 indication, which will cause the fetch unit 104 to fetch the next instruction from the CB correct target address 176. Flow ends at block 634.

The method of the present invention illustrated in FIGS. 4-6 describes how the fetch unit 104 operates in order to correctly execute fast call and return instructions in the presence of unresolved conditional branch instructions 146. The fetch unit 104 allocates a new CRS 212 when the speculation level increases and the fetch unit 104 de-allocates one or more CRS 212 when the speculation level decreases. Therefore, the proper return addresses are saved, depending on how the execution pipeline resolves conditional branch instructions 146 relative to how the fetch unit 104 predicts conditional branch instructions 146. When a correctly predicted conditional branch instruction is retired, the fast call/return stack unit 122 decrements the CRSC 214 pointed to by the non-speculative pointer 208 to reflect one less unresolved conditional branch instruction 146 (block 618 of FIG. 6). If there are no more unresolved conditional branch instructions 146 at the current speculation level, then the current CRS 212 is non-speculative and the fast call/return stack unit 122 increments the non-speculative pointer 208 to point at the next CRS 212 (block 624 of FIG. 6). When a mispredicted conditional branch instruction is retired, the fast call/return stack unit 122 makes the CRS 212 pointed to by the non-speculative CRS 212 to be the current CRS 212, flushes the pipeline, and clears the current CRSC 214, since there are no more outstanding conditional branch instructions 146 (blocks 626-632 of FIG. 6).

Referring now to FIG. 7a, a table illustrating the operation of the microprocessor 100 of FIG. 1 to process a first program sequence according to the present invention is shown. The first program sequence immediately follows the initialization steps as shown in FIG. 3. The examples depicted in FIGS. 7a-7c use four CRSC 214, identified as c0 through c3. Stack depth indicates the number of return addresses on the current CRS 212 after the current operation is completed. The pointer values are the contents of the non-speculative pointer 208 and speculative pointer 206, after the current operation is completed. The instruction pointer value is the contents of the instruction pointer 112 after the current operation is completed. The size of each instruction is four bytes and the addresses are represented in hexadecimal. Although the instruction sequences would most likely contain many other non-fast call/return instructions and non-conditional branch instructions, for brevity of illustration the examples include mainly fast call/return instructions and conditional branch instructions.

In the first step of FIG. 7a, the microprocessor 100 is initialized. Initialization causes the microprocessor 100 to clear all CRS 212 and CRSC 214 as well as the speculative pointer 206 and non-speculative pointer 208.

In the second step of FIG. 7a, the fetch unit 104 fetches an initial instruction from a fetch address 168 of 0x100.

In the third step of FIG. 7a, the fetch unit 104 fetches a fast call instruction (from address 0x104, the next sequential IP address (NSIP) 154 following the initial instruction address of the second step). The call instruction specifies a jump to address 0x300, where the fetch unit 104 fetches a new instruction. The instruction decoder 108 generates the call instruction indication 124 to the fast call/return stack unit 122. The fast call/return stack unit 122 generates the pushed return address 232, which pushes the return address value of 0x108 (the next sequential address following the call instruction 124) onto the current CRS 212 (CRS 0), and increments the stack depth of the current CRS 212 (CRS 0) to 1.

In the fourth step of FIG. 7a, the fetch unit 104 fetches a conditional branch instruction 146 from address 0x300. The conditional branch instruction 146 specifies a target address of 0xC80. It is assumed in this example that the branch predictor 118 predicts the branch is taken. The branch predictor 118 generates a predicted target address 156 of 0xC80 and a predicted direction 158 indication of taken. The fetch unit mux 114 selects the predicted target address 156 of 0xC80 and loads the predicted target address 156 into the instruction pointer 112. The instruction decoder 108 issues the conditional branch instruction 146 to the execution pipeline and generates the CB issued 162 indication to the fast call/return stack unit 122, which causes the fast call/return stack unit 122 to increment the current CRSC 214 (c0) to 1.

In the fifth step of FIG. 7a, the fetch unit 104 fetches a fast return instruction from address 0xC80, which was the predicted target address 156 of the conditional branch instruction in the fourth step. The instruction decoder 108 generates a true value on the return instruction indication 142 to the fast call/return stack unit 122. Since this is the first call 124 or return 142 instruction the fetch unit 104 fetches after a conditional branch instruction 146, the fetch unit 104 allocates a new CRS 212 (CRS 1) and copies the contents of the current CRS 212 (CRS 0) to it, clears the new CRSC 214 (c1), and increments the speculative pointer 206 to 1, making CRS 1 the current CRS 212. The fast call/return stack unit 122 reads the popped return address 166 from the new current CRS 212 (CRS 1). The fetch unit mux 114 selects the popped return address 166 of 0x108, and loads the selected address into the instruction pointer 112. The stack depth returns to zero since the return instruction 142 pops the only return address (0x108) on the new CRS 212 (CRS 1).

In the sixth step of FIG. 7a, the conditional branch instruction 146 of FIG. 7a step four is executed and retired, where the branch was correctly resolved as not taken. However, this is a branch misprediction, since the predicted branch direction (taken) does not match the correctly resolved branch direction (not taken). The retire unit 144 generates a true CB mispredicted 178 indication and the CB correct target address 176 to the fetch unit 104. As per block 626 of FIG. 6, the fetch unit 104 copies the non-speculative pointer 208 value to the speculative pointer 206. This makes CRS 0 be the current CRS 212. Thus, both the speculative pointer 206 and non-speculative pointer 208 have a value of 0. Next, per block 632 of FIG. 6, the fetch unit 104 clears the CRSC 214 (c0). Finally, per blocks 628 and 634 of FIG. 6, the microprocessor 100 flushes the execution pipeline and loads the CB correct target address 176 (0x304) into the instruction pointer 112.

Referring now to FIG. 7b, a table illustrating the operation of a second program sequence according to the present invention is shown. The second program sequence continues from where FIG. 7a ended, so the CRS 212, CRSC 214, stack count, speculative pointer 206, and non-speculative 208 pointer are the same as the last step of FIG. 7a.

In the first step of FIG. 7b, the instruction pointer 112 generates a program sequence fetch address 168 of 0x220.

In the second step of FIG. 7b, the fetch unit 104 fetches a fast call instruction from the fetch address 168 of 0x220. The call instruction specifies a call address value of 0x600, where the fetch unit 104 fetches a new instruction sequence. The instruction decoder 108 generates a true value on the call instruction indication 124 to the fast call/return stack unit 122. The fast call/return stack unit 122 generates the pushed return address 232, which pushes the return address (0x224), which is the next sequential address after the call instruction 124, onto the current CRS 212 (CRS 0). The stack depth of the current CRS 212 is 1.

In the third step of FIG. 7b, the fetch unit 104 fetches a normal instruction that is not a conditional branch instruction 146 from the fetch address 168 of 0x600. The instruction decoder 108 issues the normal instruction 146 to the execution pipeline, and the fetch unit 104 increments the instruction pointer 112.

In the fourth step of FIG. 7b, the fetch unit 104 fetches a fast call instruction from the fetch address 168 of 0x604. The call instruction specifies a call address value of 0x700, where the fetch unit 104 will fetch a new instruction sequence. The instruction decoder 108 generates a true value on the call instruction indication 124 to the fast call/return stack unit 122. The fast call/return stack unit 122 generates the pushed return address 232, which pushes the return address (0x608), which is the next sequential address after the call instruction 124, onto the current CRS 212 (CRS 0). The stack depth of the current CRS 212 is 2.

In the fifth step of FIG. 7b, the fetch unit 104 fetches a normal instruction that is not a conditional branch instruction 146 from the fetch address 168 of 0x700. The instruction decoder 108 issues the normal instruction 146 to the execution pipeline, and the fetch unit 104 increments the instruction pointer 112.

In the sixth step of FIG. 7b, the fetch unit 104 fetches a normal instruction that is not a conditional branch instruction 146 from the fetch address 168 of 0x704. The instruction decoder 108 issues the normal instruction 146 to the execution pipeline, and the fetch unit 104 increments the instruction pointer 112.

In the seventh step of FIG. 7b, the fetch unit 104 fetches a conditional branch instruction from address 0x708. The conditional branch instruction specifies a target address of 0xD80. It is assumed in this example that the branch predictor 118 predicts the branch is not taken. The branch predictor 118 generates a predicted direction 158 indication of not taken, and the incrementing circuit 116 generates the NSIP 154. The fetch unit mux 114 loads the NSIP 154 of 0x70C into the instruction pointer 112. The instruction decoder 108 issues the conditional branch instruction 146 to the execution pipeline and generates a true value on the CB issued 162 indication to the fast call/return stack unit 122, which causes the fast call/return stack unit 122 to increment the current CRSC 214 (c0) to 1.

In the eighth step of FIG. 7b, the fetch unit 104 fetches a fast return instruction from address 0x70C. The instruction decoder 108 generates a true value on the return instruction indication 142 to the fast call/return stack unit 122. Since this is the first call 124 or return 142 instruction the fetch unit 104 fetches after a conditional branch instruction 146, the fetch unit 104 copies the current CRS 212 (CRS 0) to a new CRS 212 (CRS 1), clears the new CRSC 114 (c1), and increments the speculative pointer 206 to 1. The fast call/return stack unit 122 reads the popped return address 166 from the new CRS 212 (CRS 1), and generates a true value on return instruction 142 to the fetch address control 126. The fetch unit mux 114 selects the popped return address 166, and the next instruction is fetched from the return address 0x608 of FIG. 7b fourth step. The stack depth returns to one since the return address 0x224 of FIG. 7b second step is still on the CRS 212.

In the ninth step of FIG. 7b, the conditional branch instruction 146 of FIG. 7b step seven is executed and retired, where the branch was correctly resolved as not taken. This is a correct branch prediction, since the not taken predicted direction 158 indication matches the correct branch resolution of not taken. The retire unit 144 generates a false CB mispredicted 178 indication and the CB correct target address 176 to the fetch unit 104. As per block 618 of FIG. 6, the fetch unit 104 decrements the CRSC 214 identified by the non-speculative pointer 208 (c0). Next, per block 622 of FIG. 6, the fetch unit 104 checks if the non-speculative CRSC 214 is zero. In this case, the non-speculative CRSC 214 is c0, which contains a zero value. Therefore, per block 624 of FIG. 6, the fetch unit 104 increments the non-speculative pointer 208 to 1.

In the tenth step of FIG. 7b, the fetch unit 104 fetches a fast return instruction from address 0x60C. The instruction decoder 108 generates a true value on the return instruction indication 142 to the fast call/return stack unit 122. The fast call/return stack unit 122 reads the popped return address 166 (0x224) from the current CRS 212 (CRS 1), and generates a true value on return instruction 142 to the fetch address control 126. The fetch unit mux 114 selects the popped return address 166, and the fetch unit 104 fetches the next instruction from the return address 0x224 of FIG. 7b second step. Since this is not the first call 124 or return 142 instruction the fetch unit 104 fetches after a conditional branch instruction 146 was fetched, the speculative pointer 206 is unaffected. The stack depth returns to zero since there are no more return addresses on the current CRS 212.

Referring now to FIG. 7c, a table illustrating the operation of a third program sequence according to the present invention is shown. The third program sequence continues from where FIG. 7b ended, so the CRS 212, CRSC 214, stack count, speculative pointer 206, and non-speculative 208 pointer are the same as the last step of FIG. 7b.

In the first step of FIG. 7c, the instruction pointer 112 generates a program sequence fetch address 168 of 0x540.

In the second step of FIG. 7c, the fetch unit 104 fetches a fast call instruction from the fetch address 168 of 0x540. The call instruction specifies a call address of 0x580, where the fetch unit 104 will fetch a new instruction sequence. The instruction decoder 108 generates a true value on call instruction 124 to the fast call/return stack unit 122. The fast call/return stack unit 122 generates the pushed return address 232, which pushes the return address of 0x544 onto the current CRS 212 (CRS 1). The stack depth of the current CRS 212 is 1.

In the third step of FIG. 7c, the fetch unit 104 fetches a conditional branch instruction 146 from address 0x580. The conditional branch instruction 146 specifies a target address of 0xE60. It is assumed in this example that the branch predictor 118 predicts the branch is not taken. The branch predictor 118 generates a predicted direction 158 indication of not taken, and the incrementing circuit 116 generates the NSIP 154. The fetch unit mux 114 loads the NSIP 154 of 0x584 into the instruction pointer 112. The instruction decoder 108 issues the conditional branch instruction 146 to the execution pipeline and generates a true value on the CB issued 162 indication to the fast call/return stack unit 122, which causes the fast call/return stack unit 122 to increment the current CRSC 214 (c1) to 1.

In the fourth step of FIG. 7c, the fetch unit 104 fetches a fast call instruction from the fetch address 168 of 0x584. The call instruction specifies a call address of 0x5D0, where the fetch unit 104 will fetch the next instruction. The instruction decoder 108 generates the call instruction 124 to the fast call/return stack unit 122. Since this is the first call 124 or return 142 instruction the fetch unit 104 fetches after a conditional branch instruction 146, the fetch unit 104 copies the current CRS 212 (CRS 1) to a new CRS 212 (CRS 2), clears the new CRSC 214 (c2), and increments the speculative pointer 206 to 2. The fast call/return stack unit 122 generates the pushed return address 232, which pushes the return address of 0x588 onto the new CRS 212 (CRS 2), which is the next sequential address following the call instruction. The stack depth of the new CRS 212 (CRS 2) is now 2.

In the fifth step of FIG. 7c, the fetch unit 104 fetches a fast return instruction from address 0x5D0. The instruction decoder 108 generates a return instruction 142 to the fast call/return stack unit 122. The fast call/return stack unit 122 reads the popped return address 166 from the current CRS 212 (CRS 2), and generates a true value on return instruction 142 to the fetch address control 126. The fetch unit mux 114 selects the popped return address 166, and the fetch unit 104 fetches the next instruction from the return address 0x588 of FIG. 7c fourth step. Since this is not the first call 124 or return 142 instruction the fetch unit 104 fetches after fetching a conditional branch instruction 146, the speculative pointer 206 is unaffected. The stack depth returns to one since the return address 0x544 of FIG. 7c second step is still on the CRS 212.

In the sixth step of FIG. 7c, the fetch unit 104 fetches a fast return instruction from address 0x588. The instruction decoder 108 generates a return instruction 142 to the fast call/return stack unit 122. The fast call/return stack unit 122 reads the popped return address 166 from the current CRS 212 (CRS 2), and generates a true value on return instruction 142 to the fetch address control 126. The fetch unit mux 114 selects the popped return address 166, and the fetch unit 104 fetches the next instruction from the return address 0x544 of FIG. 7c second step. Since this is not the first call 124 or return 142 instruction the fetch unit 104 fetches after fetching a conditional branch instruction 146, the speculative pointer 206 is unaffected. The stack depth returns to zero since there are no more return addresses on the current CRS 212 (CRS 2).

In the seventh step of FIG. 7c, the conditional branch instruction 146 of FIG. 7c third step is executed and retired, where the branch was correctly resolved as not taken. This is a correct branch prediction, since the not taken predicted direction 158 indication matches the correct branch resolution of not taken. The retire unit 144 generates a false CB mispredicted 178 indication and the CB correct target address 176 to the fetch unit 104. As per block 618 of FIG. 6, the fetch unit 104 decrements the CRSC 214 that the non-speculative pointer 208 identifies (c1). Next, per block 622 of FIG. 6, the fetch unit 104 checks if the non-speculative CRSC 214 (c1) is zero. In this case, the current CRSC 214 is c1, which now contains a zero value. Therefore, per block 624 of FIG. 6, the fetch unit 104 increments the non-speculative pointer 208 to 2.

In the eighth step of FIG. 7c, the microprocessor 100 encounters an exception condition. As shown in FIG. 3, the fetch unit 104 clears the speculative pointer 206, the non-speculative pointer 208, each CRS 212, and each CRSC 214. At this point the fast call/return stack unit 122 is initialized, and the exception condition determines the next fetch address 168 in the instruction pointer 112.

Figure 8:
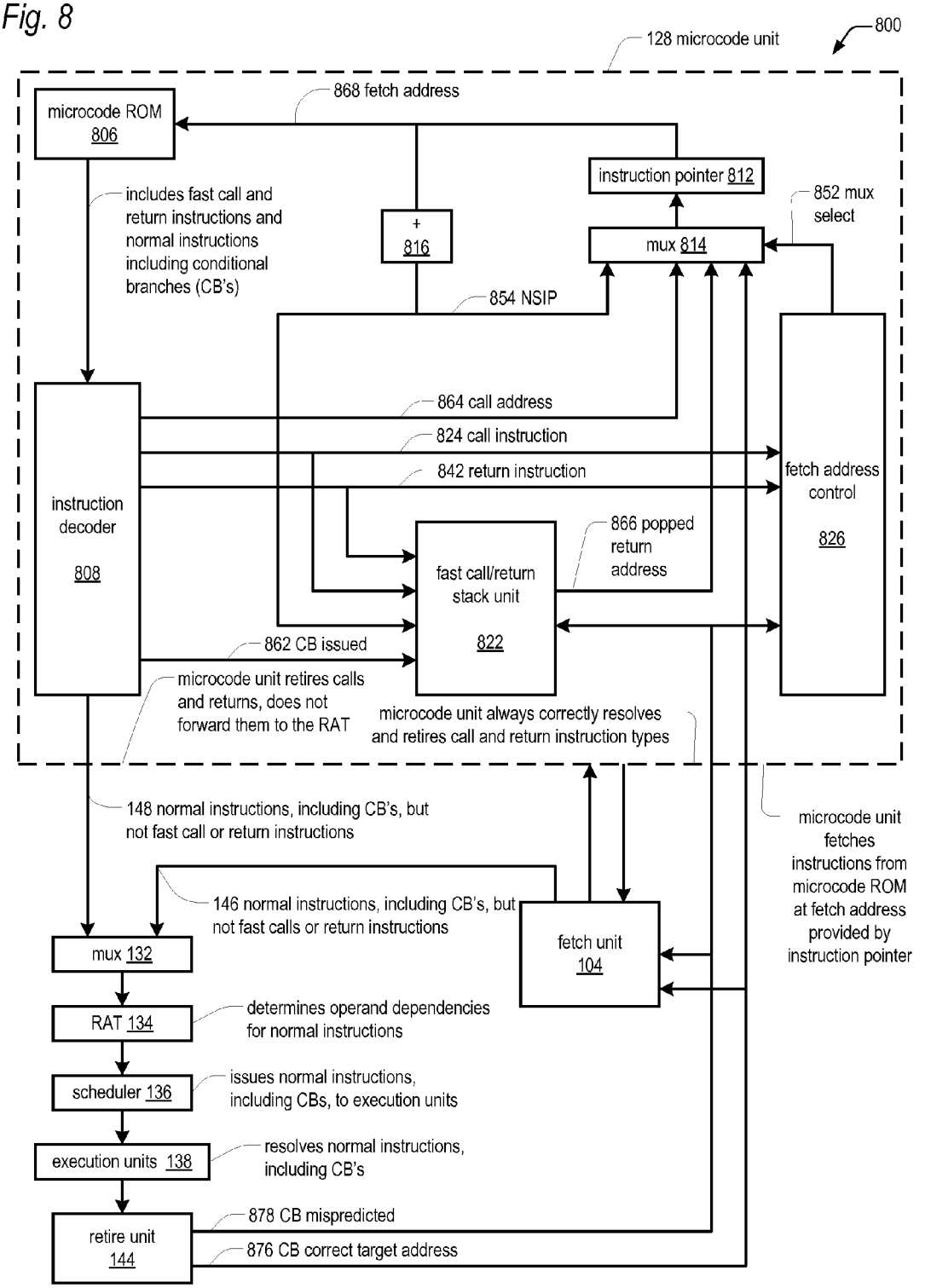
FIG. 8 is a block diagram illustrating a microprocessor according to an alternate embodiment of the present invention.

Referring now to FIG. 8, a block diagram illustrating a microprocessor 800 according to an alternate embodiment of the present invention is shown. Microprocessor 800 is similar to, and in some embodiments may be the same as, the microprocessor 100 of FIG. 1. The embodiment of FIG. 8 illustrates in detail the microcode unit 128 of FIG. 1. The microcode unit 128 includes many similar elements as the fetch unit 104 that are shown in detail in FIG. 1. In particular, the microcode unit 128 includes a fast call/return stack unit 822 that is similar to the fast call/return stack unit 122 of FIG. 2 and operates in a manner similar to that described with respect to FIGS. 3 through 7 to correctly execute and retire fast call and return instructions in the presence of instruction streams that are intermixed with conditional branch instructions. The elements of the fast call/return stack unit 822 of FIG. 8 that correspond to elements of the fast call/return stack unit 122 of FIG. 2 are numbered with an "8" in the hundreds digit, whereas the elements of the fast call/return stack unit 122 of FIG. 2 are numbered with a "2" in the hundreds digit. The fetch unit 104 of FIG. 8 is similar to the fetch unit 104 of FIG. 1, and although not shown, the microprocessor 800 of FIG. 8 also includes an instruction cache 106 similar to that of FIG. 1.

In the embodiment of FIG. 8, the microcode unit 128 correctly executes and retires fast call and return instructions included in microcode sequences that are intermixed with conditional branch instructions in a manner similar to that which the fetch unit 104 of FIG. 1 correctly executes and retires fast call and return instructions of user programs that are intermixed with conditional branch instructions. In particular, fast call and return instructions are not issued to the microprocessor 800 execution pipeline but are instead correctly executed and retired by the microcode unit 128. In the embodiment of FIG. 8, the microcode unit 128 fetches microcode instructions from a microcode ROM 806, rather than from the instruction cache 106 as in FIG. 1. The microcode instruction sequences stored in the microcode ROM 806 may include normal instructions, including conditional branch instructions, as the user programs stored in the instruction cache 106. The microcode instruction sequences stored in the microcode ROM 806 may also include fast call and return instructions as the user programs stored in the instruction cache 106. Like the fetch unit 104 of FIG. 1, the microcode unit 128 issues normal instructions 148, including conditional branch instructions 148, to the execution pipeline of the microprocessor 800. Thus, the microcode unit 128 functions as a second fetch unit within the microprocessor 800, but for microcode stored in the microcode ROM 806 rather than user programs stored in the instruction cache 106.

According to one embodiment, unlike the fetch unit 104 of FIG. 1, the microcode unit 128 does not include a branch predictor (although embodiments are contemplated in which the microcode unit 128 includes a branch predictor). Thus, at block 608 of FIG. 6, the microcode unit 128 always fetches the instruction in the microcode ROM 806 at the next sequential address 854. That is, when the microcode unit 128 fetches a conditional branch instruction from the microcode ROM 806, the microcode unit 128 always "predicts" the conditional branch of the conditional branch instruction is not taken. An incrementing circuit 816 increments the fetch address 868 of the conditional branch instruction, which generates the next sequential IP address (NSIP) 854. The fetch address control 826 generates mux select 852 to select the NSIP 854 from the microcode unit mux 814. The selected address is loaded into an instruction pointer 812, which causes the fetch address 868 to be the NSIP 854.

When a microcode conditional branch instruction 148 reaches the execution units 138, it may be correctly resolved as taken or not taken. However, unlike the fetch unit 104 of FIG. 1, in all cases a conditional branch instruction is "mispredicted" by the microcode unit 128 if correctly resolved as taken. This is because, as discussed above, the microcode unit 128 always predicts branches are not taken and fetches the instruction at the NSIP address 854 from the microcode ROM 806. If the execution units 138 correctly resolve the conditional branch instruction as taken, the retire unit 144 generates a true value on the CB mispredicted 878 indication to the microcode unit 128, along with a CB correct target address 876, and the fetch address control 826 generates a mux select 852 to cause the microcode unit mux 814 to select the CB correct target address 876. The same actions involving flushing the execution pipeline occur when the conditional branch instruction 148 is mispredicted, as earlier described with reference to blocks 626-634 of FIG. 6.

Figure 9:
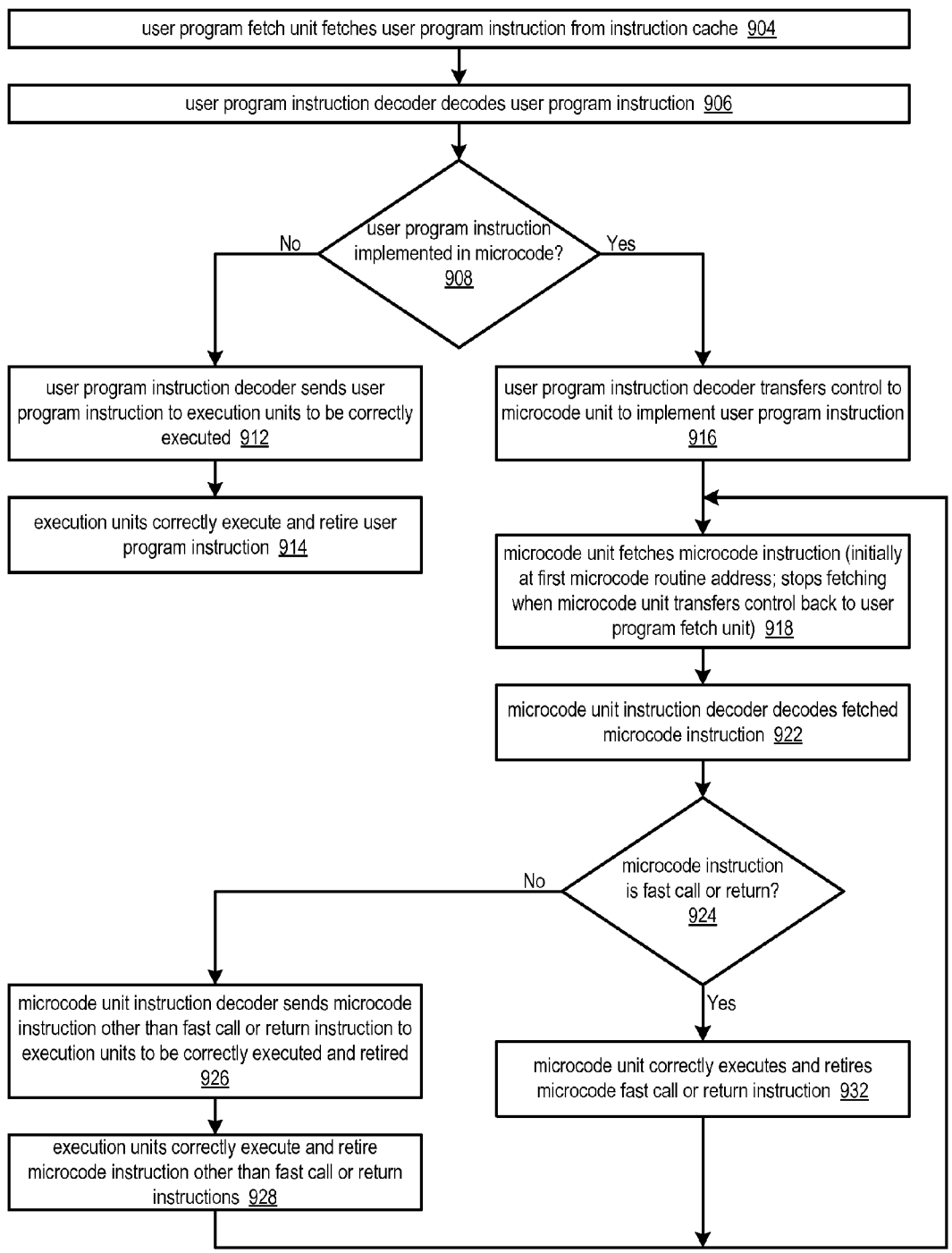
FIG. 9 is a flowchart illustrating operation of the microprocessor of FIG. 8 to process a user program instruction implemented in microcode that may include fast call and return instructions fetched and executed by a microcode unit according to the present invention.

Referring now to FIG. 9, a flowchart illustrating operation of the microprocessor 800 of FIG. 8 to process a user program instruction implemented in microcode that may include fast call and return instructions fetched and executed by a microcode unit 128 according to the present invention is shown. Flow begins at block 904.

At block 904, the fetch unit 104 of FIG. 8 fetches a user program instruction from the instruction cache 106. The user program is written in the native instruction set of the microprocessor 800, and is an operating system, application program, or any other program that the microprocessor 800 fetches from the instruction cache 106. Flow proceeds to block 906.

At block 906, the instruction decoder 108 in the user program fetch unit 104 decodes the user program instruction the user program fetch unit 104 fetches from the instruction cache 106. Flow proceeds to decision block 908.

At decision block 908, the instruction decoder 108 in the user program fetch unit 104 determines whether the user program instruction the user program fetch unit 104 fetched from the instruction cache 106 is implemented in microcode. The microcode unit 128 fetches and executes microcode instruction sequences that implement complex and/or infrequently executed user program instructions. Additionally, the microcode instruction sequences include exception handlers. If the user program instruction is not implemented in microcode, then flow proceeds to block 912. If the user program instruction is implemented in microcode, then flow proceeds to block 916.

At block 912, the instruction decoder 108 in the fetch unit 104 dispatches the user program instruction to execution units 138 to be correctly executed. Flow proceeds to block 914.

At block 914, the execution units 138 correctly execute and retire the user program instruction. In particular, the execution units 138 correctly execute conditional branch instructions dispatched by the microcode unit 128 by determining the correct branch direction and correct target address similar to the manner described with respect to FIG. 6. Flow ends at block 914.

At block 916, the instruction decoder 108 in the fetch unit 104 transfers control to the microcode unit 128 to implement the user program instruction. The microcode unit 128 stores a microcode instruction sequence that implements the user program instruction. Flow proceeds to block 918.

At block 918, the microcode unit 128 fetches a microcode instruction from the microcode ROM 806. Initially, the microcode unit 128 fetches the microcode instruction from a first microcode routine address specified by the fetch unit 104. The microcode unit 128 stops fetching microcode instructions when it encounters a microcode instruction that instructs the microcode unit 128 to transfer control back to the fetch unit 104. In this manner, the microcode unit 128 fetches and executes a sequence of microcode instructions to implement a single user program instruction. Flow proceeds to block 922.

At block 922, the instruction decoder 808 in the microcode unit 128 decodes the fetched microcode instruction from block 918. Flow proceeds to decision block 924.

At decision block 924, the microcode unit 128 determines if the fetched microcode instruction is a fast call or return instruction. In a manner similar to that described above with respect to the embodiment of FIGS. 1 through 7, the microcode unit 128 executes and retires fast call or return instructions within the microcode unit 128, and does not transfer call or return instructions to the microprocessor 800 execution units 138. If the fetched instruction is not a fast call or return instruction, then flow proceeds to block 926. If the fetched instruction is a fast call or return instruction, then flow proceeds to block 932.

At block 926, the instruction decoder 808 in the microcode unit 128 sends the fetched microcode instruction, which is not a call or return instruction, to the execution units 138 to be correctly executed and retired. The fetched microcode instruction is a normal instruction 148. Flow proceeds to block 928.

At block 928, the execution units 138 correctly execute and retire the microcode instruction that is a normal instruction 148. If the normal instruction 148 is a conditional branch instruction, the execution units 138 and retire unit 144 execute and retire the conditional branch instruction as described in block 914. If the normal instruction 148 is the last instruction in the microcode instruction sequence, then the microcode unit 128 returns control to the user program fetch unit 104, and flow ends at block 928; otherwise, flow returns to block 918.

At block 932, the microcode unit 128 correctly executes and retires the microcode fast call or return instruction similar to the manner described with respect to FIGS. 4 and 5, respectively. Microcode call or return instructions executed and retired within the microcode unit 128 are fast call or return instructions since they are not issued to the execution units 138 and do not incur the execution pipeline latencies. If the fast call or return instruction is the last instruction in the microcode instruction sequence, then the microcode unit 128 returns control to the user program fetch unit 104, and flow ends at block 932; otherwise, flow returns to block 918.

Although the embodiments of FIGS. 1-7 and 8-9 have been described separately, an embodiment is contemplated in which both the fetch unit 104 and the microcode unit 128 execute and retire fast call and return instructions.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   execution units, configured to resolve conditional branch instructions;
   a plurality of call/return stacks (CRS); and
   a fetch unit, coupled to the plurality of call/return stacks (CRS), configured to fetch a call or return instruction, the fetch unit further configured to determine whether a state exists, wherein said state comprises that the call or return instruction is the first call or return instruction fetched by the fetch unit after it has fetched a conditional branch instruction that has yet to be resolved by the execution units, the fetch unit further configured to copy a contents of a current one of the plurality of CRS to another one of the plurality of CRS and designate the other one of the plurality of CRS as the current one of the plurality of CRS, if said state exists;
   wherein after the fetch unit determines whether the state exists, and if said state exists, copies and designates:
      if the call or return instruction is a call instruction, the fetch unit pushes a first return address onto the current one of the plurality of CRS and fetches an instruction at a target address specified by the call instruction, wherein the first return address is an address of a next sequential instruction after the call instruction; and
      if the call or return instruction is a return instruction, the fetch unit pops a second return address from the current one of the plurality of CRS and fetches an instruction at the second return address.

2. The microprocessor as recited in claim 1, wherein the fetch unit is configured to refrain from issuing the call or return instruction to the execution units of the microprocessor.

3. The microprocessor as recited in claim 1, wherein the fetch unit, rather than the execution units of the microprocessor, determines, copies, and pushes and fetches or pops and fetches to resolve the call or return instruction.

4. The microprocessor as recited in claim 3, wherein the fetch unit correctly resolves the call or return instruction.

5. The microprocessor as recited in claim 1, further comprising:

a speculative identifier, coupled to the plurality of call/return stacks (CRS), wherein the speculative identifier identifies the current one of the plurality of CRS, wherein the speculative identifier identifies the other one of the plurality of CRS as the current one of the plurality of CRS when the fetch unit designates the other one of the plurality of CRS as the current one of the plurality of CRS.

6. The microprocessor as recited in claim 5, further comprising:
a non-speculative identifier, coupled to the plurality of call/return stacks (CRS), configured to identify one of the plurality of CRS that contains return addresses associated only with call instructions that are older in program order than all unresolved conditional branch instructions;
wherein the fetch unit is further configured to update the speculative identifier with the non-speculative identifier, in response to the execution unit resolving one of the unresolved conditional branch instructions and determining that the microprocessor mispredicted the conditional branch instruction.

7. The microprocessor as recited in claim 6, wherein the execution units of the microprocessor resolve said one of the unresolved conditional branch instructions.

8. The microprocessor as recited in claim 6, further comprising:
a respective counter associated with each of the plurality of CRS;
wherein the fetch unit is configured to increment the counter associated with the one of the plurality of CRS identified by the speculative identifier, in response to fetching a conditional branch instruction.

9. The microprocessor as recited in claim 8, wherein the fetch unit clears the counter associated with the one of the plurality of CRS identified by the non-speculative identifier, after the fetch unit updates the speculative identifier with the non-speculative identifier.

10. The microprocessor as recited in claim 9, wherein the fetch unit decrements the counter associated with the one of the plurality of CRS identified by the non-speculative identifier, in response to the execution unit resolving one of the unresolved conditional branch instructions and determining that the microprocessor correctly predicted the conditional branch instruction.

11. The microprocessor as recited in claim 10, wherein the fetch unit updates the non-speculative identifier if the fetch unit decremented the counter to zero.

12. The microprocessor as recited in claim 9, wherein the fetch unit clears the counter associated with the one of the plurality of CRS identified by the speculative identifier after the fetch unit updates the speculative identifier to identify the other one of the plurality of CRS as the current one of the plurality of CRS.

13. A method for a fetch unit of a microprocessor to correctly resolve a call or return instruction rather than issuing the call or return instruction to execution units of the microprocessor to be resolved, the microprocessor having a plurality of call/return stacks (CRS), the method comprising:
fetching a call or return instruction;
determining whether a state exists, in response to said fetching, said state comprising that the call or return instruction is the first call or return instruction fetched by the fetch unit after fetching a conditional branch instruction that has yet to be resolved by the execution units;
copying a contents of a current one of the plurality of CRS to another one of the plurality of CRS and designating the other one of the plurality of CRS as the current one of the plurality of CRS, if said state exists; and
after said determining and, if said state exists, said copying and designating:
if the call or return instruction is a call instruction, pushing a first return address onto the current one of the plurality of CRS and fetching an instruction at a target address specified by the call instruction, wherein the first return address is an address of a next sequential instruction after the call instruction; and
if the call or return instruction is a return instruction, popping a second return address from the current one of the plurality of CRS and fetching an instruction at the second return address.

14. The method as recited in claim 13, further comprising:
refraining from issuing the call or return instruction to the execution units of the microprocessor.

15. The method as recited in claim 13, wherein said determining, said copying, and said pushing and fetching or said popping and fetching are performed by the fetch unit of the microprocessor to resolve the call or return instruction rather than by the execution units of the microprocessor.

16. The method as recited in claim 15, wherein the fetch unit correctly resolves the call or return instruction by performing said fetching, said determining, said copying and designating, and said pushing and fetching or said popping and fetching.

17. The method as recited in claim 13, wherein the microprocessor includes a speculative identifier that identifies the current one of the plurality of CRS:
wherein said designating comprises updating the speculative identifier to identify the other one of the plurality of CRS as the current one of the plurality of CRS.

18. The method as recited in claim 17, wherein the microprocessor includes a non-speculative identifier that identifies one of the plurality of CRS that that contains return addresses associated only with call instructions that are older in program order than all unresolved conditional branch instructions, the method further comprising:
updating the speculative identifier with the non-speculative identifier, in response to resolving one of the unresolved conditional branch instructions and determining that the microprocessor mispredicted the conditional branch instruction.

19. The method as recited in claim 18, wherein the microprocessor includes a respective counter associated with each of the plurality of CRS, the method further comprising:
clearing the counter associated with the one of the plurality of CRS identified by the non-speculative identifier, after said updating the speculative identifier with the non-speculative identifier.

20. The method as recited in claim 18, wherein said resolving one of the unresolved conditional branch instructions is performed by the execution units of the microprocessor.

21. The method as recited in claim 18, wherein the microprocessor includes a respective counter associated with each of the plurality of CRS, the method further comprising:
incrementing the counter associated with the one of the plurality of CRS identified by the speculative identifier, in response to fetching a conditional branch instruction.

22. The method as recited in claim 21, further comprising:
decrementing the counter associated with the one of the plurality of CRS identified by the non-speculative identifier, in response to resolving one of the unresolved conditional branch instructions and determining that the microprocessor correctly predicted the conditional branch instruction.

23. The method as recited in claim 22, further comprising:
updating the non-speculative identifier if said decrementing causes the counter to reach zero.

24. The method as recited in claim 21, further comprising:
clearing the counter associated with the one of the plurality of CRS identified by the speculative identifier, in response to said updating the speculative identifier to identify the other one of the plurality of CRS as the current one of the plurality of CRS.

25. A computer program product for use with a computing device, the computer program product comprising:
a computer usable storage medium, having computer readable program code embodied in said medium, for specifying a microprocessor that immediately resolves call and return instructions in a fetch unit of the microprocessor rather than issuing the call and return instructions to execution units of the microprocessor, the computer readable program code comprising:
first program code for specifying a plurality of call/return stacks (CRS); and
second program code for specifying a fetch unit, coupled to the plurality of call/return stacks (CRS), configured to fetch a call or return instruction, the fetch unit further configured to determine whether a state exists, in response to fetching the call or return instruction, the fetch unit further configured to copy a contents of a current one of the plurality of CRS to another one of the plurality of CRS and designate the other one of the plurality of CRS as the current one of the plurality of CRS, if said state exists, wherein said state comprising that the call or return instruction is the first call or return instruction fetched by the fetch unit after it fetches a conditional branch instruction that has yet to be resolved by the execution units;
wherein after the fetch unit determines whether the state exists, and if said state exists, copies and designates:
if the call or return instruction is a call instruction, the fetch unit pushes a first return address onto the current one of the plurality of CRS and fetches an instruction at a target address specified by the call instruction, wherein the first return address is an address of a next sequential instruction after the call instruction; and
if the call or return instruction is a return instruction, the fetch unit pops a second return address from the current one of the plurality of CRS and fetches an instruction at the second return address.

* * * * *